United States Patent
Lin et al.

(10) Patent No.: US 11,634,161 B2
(45) Date of Patent: Apr. 25, 2023

(54) PATH PLANNING USING DELTA COST VOLUME GENERATED FROM MOVEMENT RESTRICTIONS AND OBSERVED DRIVING BEHAVIOR

(71) Applicant: Woven Planet North America, Inc., Los Altos, CA (US)

(72) Inventors: Tsung-Han Lin, Belmont, CA (US); Sammy Omari, Los Altos, CA (US); Peter Ondruska, London (GB); Matthew Swaner Vitelli, San Francisco, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 122 days.

(21) Appl. No.: 16/911,079

(22) Filed: Jun. 24, 2020

(65) Prior Publication Data
US 2021/0403045 A1 Dec. 30, 2021

(51) Int. Cl.
*B60W 60/00* (2020.01)
*G01C 21/34* (2006.01)
*G01C 21/36* (2006.01)

(52) U.S. Cl.
CPC ..... *B60W 60/0023* (2020.02); *G01C 21/3453* (2013.01); *G01C 21/3691* (2013.01);
(Continued)

(58) Field of Classification Search
CPC ...... B60W 40/02; B60W 40/04; B60W 40/10; B60W 50/0098; B60W 2050/065;
(Continued)

(56) References Cited

U.S. PATENT DOCUMENTS 10,906,558 B1 * 2/2021 Hwang ............ B60W 60/0027
11,161,502 B2 * 11/2021 Caldwell .......... B60W 30/0956
(Continued)

FOREIGN PATENT DOCUMENTS

JP 2018192954 A 12/2018
WO 2019099498 A1 5/2019

OTHER PUBLICATIONS

Zeng, Wenyuan, Wenjie Luo, Simon Suo, Abbas Sadat, Bin Yang, Sergio Casas, and Raquel Urtasun. "End-to-end interpretable neural motion planner." In Proceedings of the IEEE/CVF Conference on Computer Vision and Pattern Recognition, pp. 8660-8669. 2019.
International Searching Authority, International Search Report and Written Opinion, PCT/US2021/028962, dated Aug. 2, 2021.

*Primary Examiner* — Russell Frejd
*Assistant Examiner* — Brandon Z Willis
(74) *Attorney, Agent, or Firm* — Christopher G. Darrow; Darrow Mustafa PC

(57) ABSTRACT

In one embodiment, a method includes determining an initial cost volume associated with a plurality of potential trajectories of a vehicle in an environment based on a set of movement restrictions of the vehicle, generating a delta cost volume using the initial cost volume and environment data associated with the environment, wherein the delta cost volume is generated by determining adjustments to the initial cost volume that incorporate observed driving behavior, and scoring a trajectory of the plurality of potential trajectories for the vehicle based on the initial cost volume and the delta cost volume.

20 Claims, 17 Drawing Sheets

(52) U.S. Cl.
CPC ..... *B60W 2420/42* (2013.01); *B60W 2420/52* (2013.01); *B60W 2552/53* (2020.02); *B60W 2554/80* (2020.02)

(58) Field of Classification Search
CPC ........... B60W 2552/53; B60W 60/001; B60W 60/0011; B60W 60/0023; B60W 60/0027; B60W 60/00272; B60W 60/00274; B60W 2420/42; B60W 2420/52; B60W 2554/80; B60W 2554/40; B60W 2554/20; G01C 21/34; G01C 21/3453; G01C 21/3484; G01C 21/3492; G01C 21/3461; G01C 21/3691
See application file for complete search history.

(56) References Cited

U.S. PATENT DOCUMENTS

| | | | |
|---|---|---|---|
| 2019/0186936 A1 | 6/2019 | Ebner et al. | |
| 2019/0189693 A1 | 6/2019 | Kobayashi et al. | |
| 2019/0204842 A1* | 7/2019 | Jafari Tafti | B60W 60/0011 |
| 2020/0139959 A1* | 5/2020 | Akella | G05D 1/0088 |
| 2020/0150671 A1 | 5/2020 | Fan et al. | |
| 2020/0159225 A1* | 5/2020 | Zeng | G05D 1/0088 |
| 2021/0129834 A1* | 5/2021 | Gier | G05D 1/0214 |
| 2021/0276598 A1* | 9/2021 | Amirloo Abolfathi | G06K 9/6256 |
| 2021/0373161 A1* | 12/2021 | Lu | G01S 17/89 |

* cited by examiner

PATH PLANNING USING DELTA COST VOLUME GENERATED FROM MOVEMENT RESTRICTIONS AND OBSERVED DRIVING BEHAVIOR

BACKGROUND

Autonomous vehicles rely on effective and efficient path planning to drive in urban environments with the safest, most convenient, and most economically beneficial vehicle-trajectories. A vehicle-trajectory is a sequence of states visited by the vehicle, parameterized by time and velocity. Trajectory planning or trajectory generation is the real-time planning of a vehicle's move from one feasible state to the next, satisfying the vehicle's kinematic limits based on its dynamics and as constrained by the navigation mode. Finding a potential vehicle-trajectory is complicated as the path planning system needs to identify all the static and moving agents and make sure the potential vehicle-trajectory bypass these agents. Finding the potential vehicle-trajectory may be based on trajectory optimization, which is the process of determining a trajectory that minimizes (or maximizes) some measure of performance, e.g., cost, while satisfying a set of constraints. The cost for a potential vehicle-trajectory may be based on many factors including safety, comfort, efficiency, position, velocity, acceleration, feasibility, legality, etc.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1B:
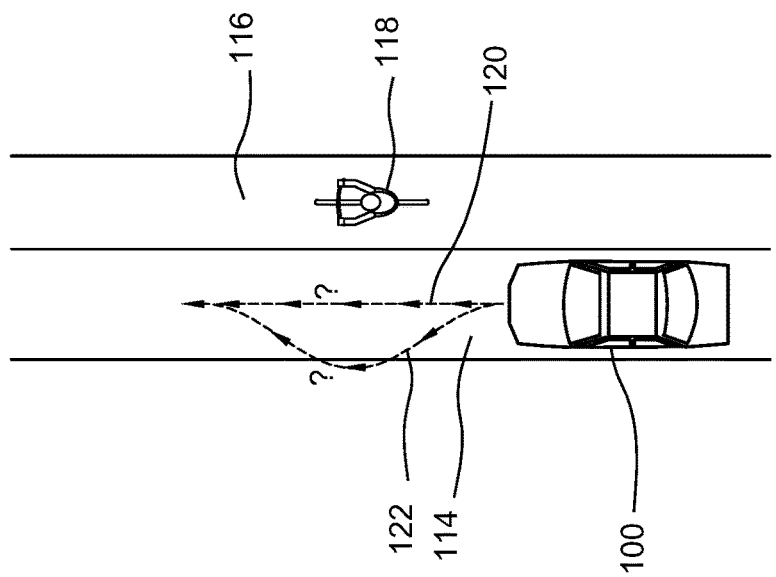
FIG. 1B illustrates an example of trajectory determination for a vehicle driving beside a bike lane.
Figure 1A:
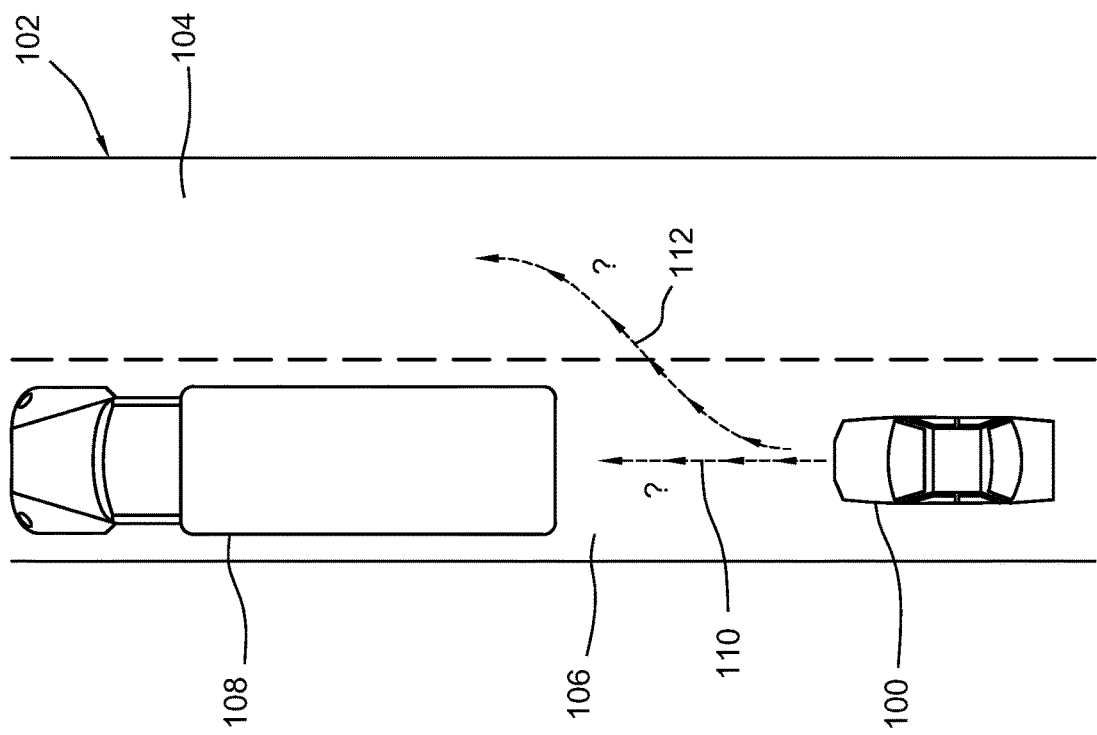
FIG. 1A illustrates an example of trajectory determination for a vehicle following a cargo truck.
Figure 1C:
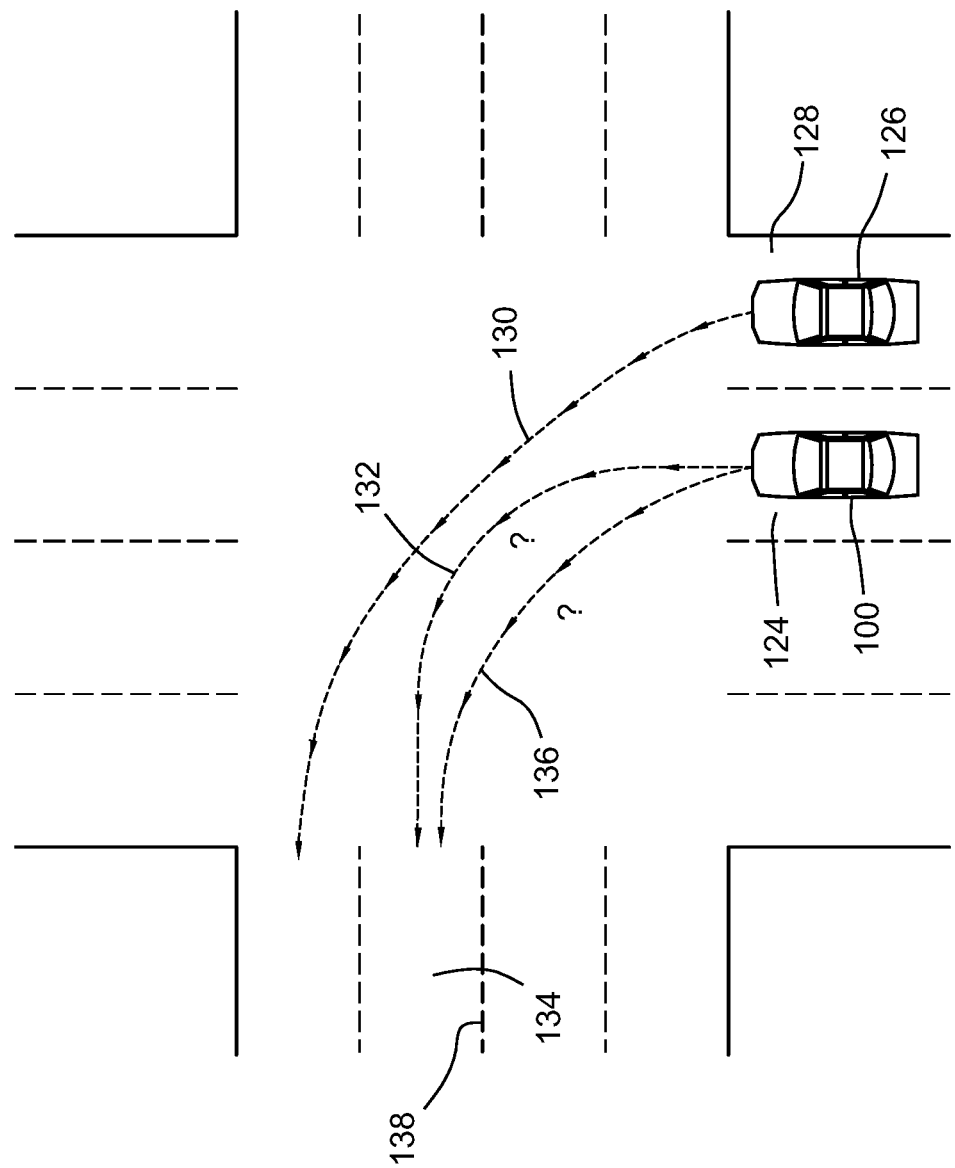
FIG. 1C illustrates an example of trajectory determination for a vehicle making a turn at an intersection.
Figure 1D:
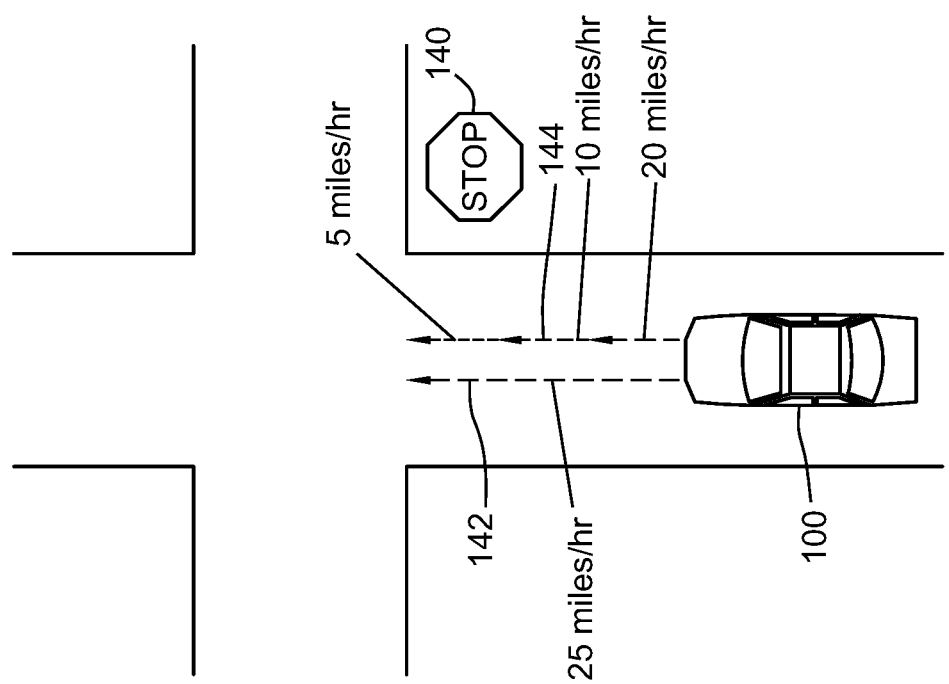
FIG. 1D illustrates an example of trajectory determination for a vehicle approaching a stop sign.

Vehicle-trajectory planning may be one basis for autonomous driving. As an example and not by way of limitation, every once a while, a computing system may need to determine the best trajectory forward for the next few seconds for an autonomous vehicle. For example, the computing system may determine if the vehicle should accelerate, go straight, or take a slight turn. FIGS. 1A-1D illustrate different scenarios where a planned trajectory needs to be determined for an autonomous vehicle. FIG. 1A illustrates an example trajectory determination for a vehicle following a cargo truck. The vehicle 100 may be driving on a road 102 with two lanes, i.e., right lane 104 and left lane 106. The vehicle 100 may be following the cargo truck 108 on the left lane 106. The computing system may need to determine if the vehicle 100 should keep following the cargo truck 108 or change to the right lane 104, which is indicated by two potential trajectories, i.e., trajectory 110 and trajectory 112, respectively. FIG. 1B illustrates an example trajectory determination for a vehicle driving beside a bike lane. The vehicle 100 may be driving in a lane 114 adjacent to a bike lane 116. In the bike lane 116 there may be a cyclist 118. The vehicle 100 may be approaching the cyclist 118 from behind. As such, the computing system may need to determine if the vehicle 100 should keep driving straight or slightly to the left and then back to the middle of the lane to avoid hitting the cyclist, which is indicated by two potential trajectories, i.e., trajectory 120 and trajectory 122, respectively. FIG. 1C illustrates an example trajectory determination for a vehicle making a turn at an intersection. The vehicle 100 may need to make a left turn from lane 124 while there is another vehicle 126 beside the vehicle 100 that is also making a left turn from lane 128. A potential trajectory for vehicle 126 may be trajectory 130. The computing system may need to determine if to turn left using a trajectory 132 that ends in the middle of the lane 134 or a trajectory 136 that ends close to the lane divider 138. FIG. 1D illustrates an example trajectory determination for a vehicle approaching a stop sign. The computing system may need to determine if the vehicle 100 should approach the stop sign 140 with a steady velocity, e.g., 25 miles/hour or with a gradually reduced velocity, e.g., 20 miles/hour then 10 miles/hour and then 5 miles/hour. These two options may be illustrated by trajectory 142 and trajectory 144, respectively. For the scenarios in FIGS. 1A-1D, the computing system may determine the planned trajectory by optimizing a set of different costs evaluated by different factors. As an example and not by way of limitation, the cost of the vehicle 100 hitting other agents may be extremely high. As another example and not by way of limitation, the cost for crossing lane boundaries may be very high. As yet another example and not by way of limitation, the cost of the vehicle 100 driving with a high lateral acceleration or high lateral jerk may be also high because that would make it uncomfortable for passengers in the vehicle 100. Therefore, it is important to accurately determine the cost for each potential trajectory and select the planned trajectory based on the cost.

Determining the cost for a potential trajectory may be based on a set of hand-engineered costs determined based on movement restrictions of the vehicle 100. As an example and not by way of limitation, one of the costs may be based on a penalized jerk. A penalized jerk may be the sum of all the jerks along the trajectory being penalized with some weight. Accordingly, a trajectory that minimizes all these different costs may be determined as a planned trajectory the vehicle 100 should take going forward. Based on the hand-engineered costs, a cost volume may be generated. A cost volume, which may be based on space and time, may provide cost information associated with each location associated with the potential trajectory under different time. Instead of using hand-engineered costs, a cost volume may be directly learned from observed driving behavior by machine-learning models. With cost volumes, the computing system may look up the cost associated with each potential trajectory in the cost volume occasionally, e.g., after every 10 centimeters of driving, and then select the best trajectory based on the cost.

Using hand-engineered costs to generate cost volumes may have limitations. Firstly, the cost volumes generated from hand-engineered costs may not effectively handle how a vehicle 100 should interact with other agents on non-edge cases. A non-edge case may be related to elegance, e.g., how to smoothly pass an agent. For instance, should a vehicle 100 slow down a little bit before it passes a cyclist 118 or should the vehicle 100 go faster, and what is the exact distance should the vehicle 100 keep from the cyclist 118? Secondly, determining hand-engineered costs may be hard to scale as there may be a vast number of driving scenarios. Thirdly, hand-engineered costs may require expert knowledge on the problem domain and may be time-consuming. Lastly, designing hand-engineered costs may be limited by the complexity that humans can put in it. Using machine-learning models to learn cost volumes may be useful for addressing the limitations of hand-engineered costs by learning from observed driving behavior. However, relying only on observed driving behavior may also have limitations. Firstly, there may be no interpretability for the learned machine learning models. Secondly, as the cost volume is generated based on observed driving behavior only, the cost volume may be only as complete as the data provided. As an example and not by way of limitation, if the observed driving behavior lacks certain scenarios, the cost volume may not adequately reflect the cost of such scenarios. Thirdly, it may be inflexible as it is difficult to define costs since everything is learned from the observed driving behavior. As a result, if one wants to use some movement restrictions that are not necessarily reflected in the observed driving behavior when calculating costs, it may be necessary to generate data incorporating these movement restrictions via simulation or manual runs, which may be expensive and hard to scale. Lastly, sometimes one may not want to learn from bad driving practice (e.g., maybe the observed driving behavior includes too much tailgating).

To address the shortcomings of both the two aforementioned approaches for generating cost volumes, the embodiments disclosed herein generate a cost volume based on not only observed driving behavior but also hand-engineered costs and determine a cost for a trajectory accordingly. Integrating hand-engineered costs and observed driving behavior may bring in advantages from both worlds. The embodiments disclosed herein may incorporate a plurality of hand-engineered costs into the learning of a machine-learning model. In particular embodiments, the computing system may determine an initial cost volume associated with a plurality of potential trajectories of a vehicle 100 in an environment based on a set of movement restrictions of the vehicle 100. The computing system may then generate a delta cost volume using the initial cost volume and environment data associated with the environment. In particular embodiments, the delta cost volume may be generated by determining adjustments to the initial cost volume that incorporate observed driving behavior. The computing system may further score a trajectory of the plurality of potential trajectories for the vehicle 100 based on the initial cost volume and the delta cost volume.

Figure 2:
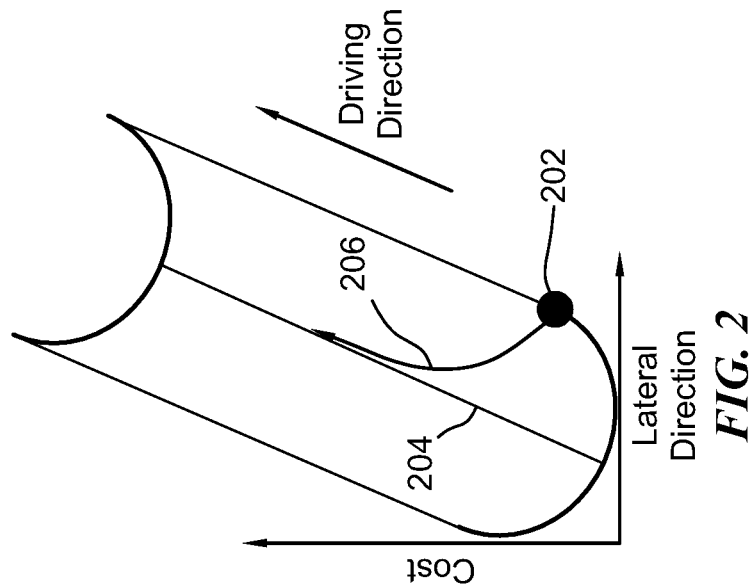
FIG. 2 illustrates an example of cost evaluation.

FIG. 2 illustrates an example cost evaluation. The cost evaluation may be for a vehicle 100 driving in a lane. The vehicle 100 may be denoted by a black dot 202. The lateral direction may indicate the direction with respect to the lane boundaries. As illustrated in FIG. 2, the further the vehicle 100 deviates from the center 204 of the lane, the higher the cost is. FIG. 2 may indicate that a preferred trajectory 206 for the vehicle 100 may be going towards the center 204 as the cost will gradually reduce.

Figure 3:
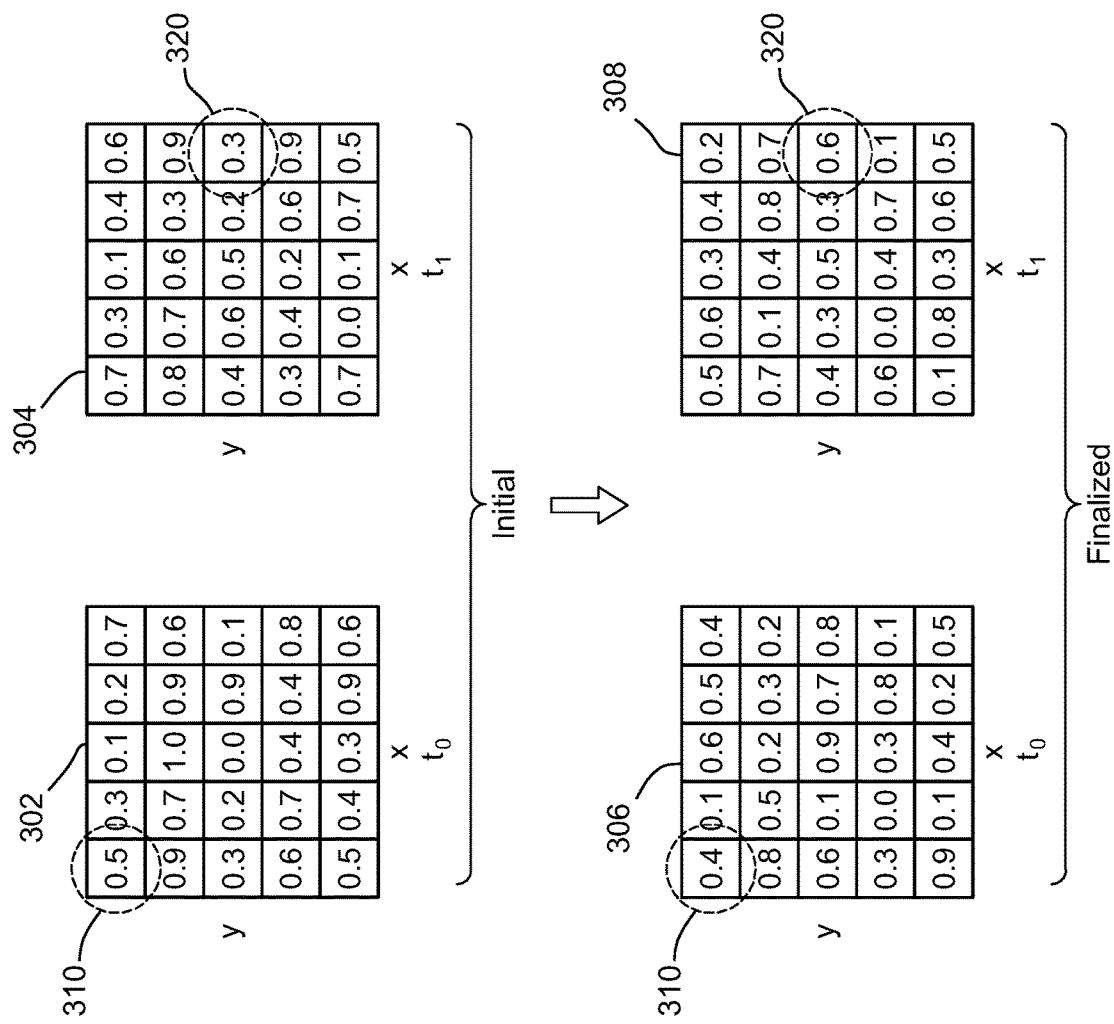
FIG. 3 illustrates an example of a difference between an initial cost volume and a differential cost volume.

FIG. 3 illustrates an example difference between an initial cost volume and a finalized cost volume. As indicated in FIG. 3, a cost volume 300 may be visualized as a three-dimensional volume based on space (denoted by x- and y-axis) and time (denoted by t-axis). The cost volume 300 may comprise cost measurements at a plurality of locations along each potential trajectory associated with a plurality of timestamps (e.g., $t_0$ and $t_1$). In particular embodiments, the initial cost volume may comprise initial cost measurements at a plurality of locations along each of the plurality of potential trajectories associated with a plurality of timestamps. The initial cost volume may be embodied into a three-dimensional lookup table having cells that are encoded with the initial cost measurement values. As an example and not by way of limitation, a slice 302 of the initial cost volume at to may have some cost measurement values at different locations according to x-y axis. As another example and not by way of limitation, a slice 304 of the initial cost volume at $t_1$ may have some cost measurement values at different locations according to x-y axis.

In particular embodiments, the computing system may generate a finalized cost volume based on a summation of the initial cost volume and the delta cost volume. The finalized cost volume may comprise finalized cost measurements at the plurality of locations associated with the plurality of timestamps. Each finalized cost measurement may comprise an adjustment to an initial cost measurement. In particular embodiments, the computing system may determine that the delta cost volume ensures each finalized cost measurement of the finalized cost volume is greater than a threshold measurement. Similarly, the computing system may embody the finalized cost volume into a three-dimensional lookup table having cells that are encoded with the finalized cost measurement values. As an example and not by way of limitation, a slice 306 of the finalized cost volume at to may have some cost measurement values at different locations according to x-y axis. By comparing the slice 306 with the slice 302, one may see that these cost measurement values are adjusted from those in the initial cost volume at corresponding locations. For example, for a location 310 at t0, the initial cost measurement value may be 0.5 according to slice 302 whereas the finalized cost measurement value may be 0.4 according to slice 306 because of an adjustment of −0.1. As another example and not by way of limitation, a slice 308 of the finalized cost volume at $t_1$ may have some cost measurement values at different locations according to x-y axis. By comparing the slice 308 with the slice 304, one may see that these cost measurement values are also adjusted from those in the initial cost volume at corresponding locations. For example, for a location 320 at t1, the initial cost measurement value may be 0.3 according to slice 304 whereas the finalized cost measurement value may be 0.6 according to slice 308 because of an adjustment of 0.3. In particular embodiments, a cost measurement associated with the initial cost volume or finalized cost volume may be based on one or more of a positional cost, a velocity cost, a cost based on steering angle, an acceleration cost, a jerk cost, any suitable cost, or any suitable combination thereof. The velocity cost, cost based on steering angle, acceleration cost, or jerk cost may be either hand-engineered or machine-learned from observed driving behavior. As an example and not by way of limitation, for location 310 at t0, the positional cost may indicate the cost of a vehicle being at this position at this time whereas the velocity cost may indicate the cost of the vehicle being at this position at this time driving with a particular velocity.

Figure 4:
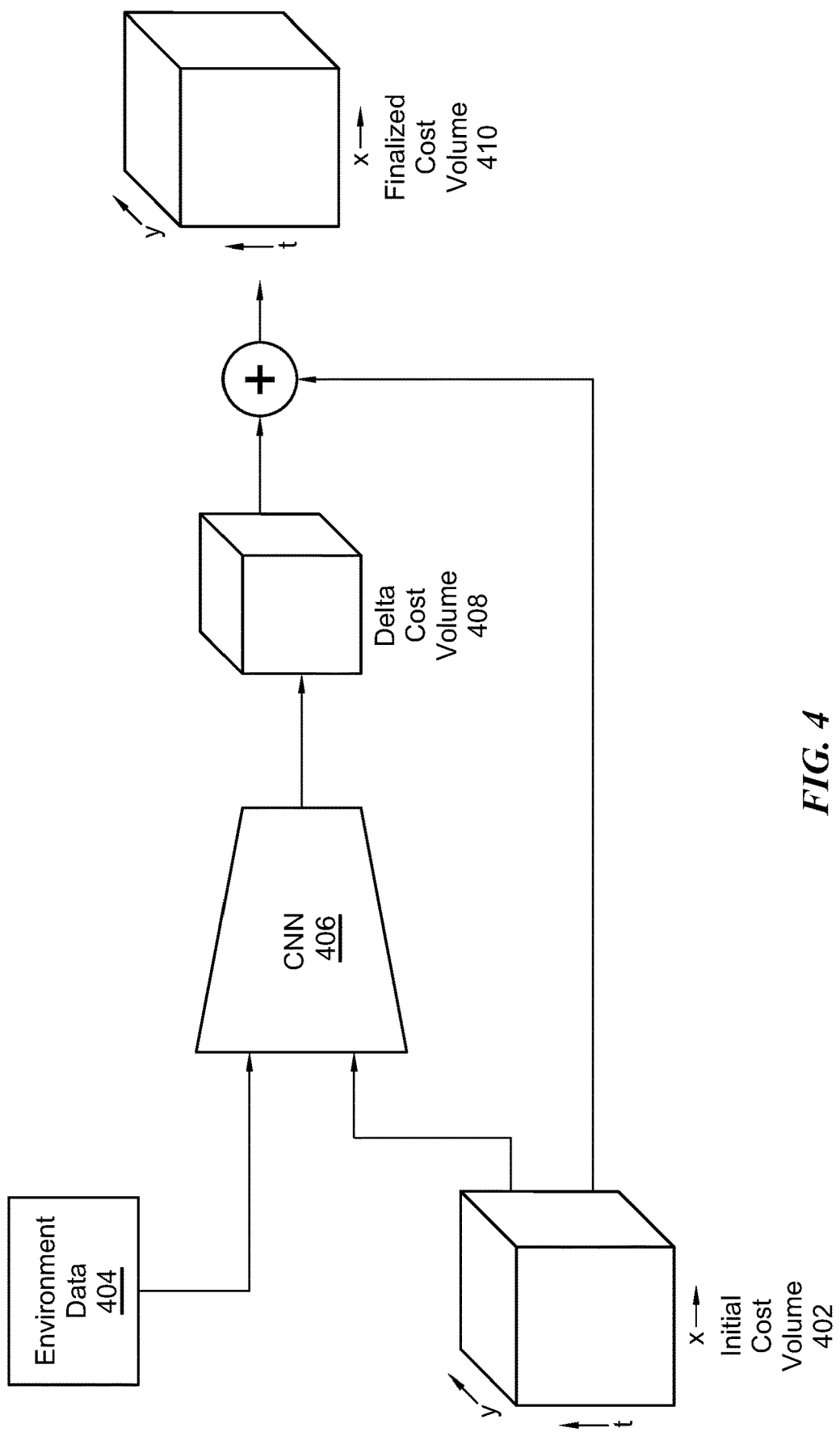
FIG. 4 illustrates an example of an architecture of generating a differential cost volume.

FIG. 4 illustrates an example architecture of generating a finalized cost volume. As indicated in FIG. 4, an initial cost volume 402 may be determined for a vehicle 100 in an environment based on a set of movement restrictions of the vehicle 100. As an example and not by way of limitation, the set of movement restrictions may comprise a restriction that the vehicle 100 should keep a distance to the lane boundaries. As another example and not by way of limitation, the set of movement restrictions may comprise a restriction that the vehicle 100 should not get too close to other agents. As yet another example and not by way of limitation, the set of movement restrictions may comprise a restriction that there should be no high jerk or high acceleration.

In particular embodiments, the computing system may access environment data 404 associated with the environment. The computing system may generate the environment data 404 by rasterizing one or more top-down images of the vehicle 100 and agents around the vehicle 100 in the environment. Accordingly, the environment data 404 may comprise information comprising one or more of distances between the vehicle 100 and the agents, lane boundaries associated with the driving environment, velocities of the vehicle 100 and the agents, driving directions of the vehicle 100 and the agents, yield relationships between the vehicle 100 and the agents, locations of the vehicle 100 and the agents, and the like.

In particular embodiments, the computing system may then determine the adjustments to the initial cost volume 402 that incorporate observed driving behavior based on a machine-learning model. The machine-learning model be trained based on observed driving data (e.g., real-world road missions, simulation, etc.), thereby allowing it to be able to incorporate observed driving behavior when determining the adjustments. In particular embodiments, the machine-learning model may be based on convolutional neural networks (CNN) 406. The CNN 406 may further determine the adjustments, i.e., delta cost volume 408 as illustrated in FIG. 4 based on both the initial cost volume 402 and the environment data 404. The computing system may then integrate the delta cost volume 408 and the initial cost volume 402 to generate the finalized cost volume 410.

Taking the scenario in FIG. 1B as an example, generating the finalized cost volume 410 as illustrated in FIG. 4 may be explained intuitively as follows. The movement restrictions may require that the vehicle 100 should not go over the lane boundaries. Accordingly, the initial cost volume 402 may have a high cost for the trajectory going over the left lane boundary of lane 114. In the environment data 404 there may be the vehicle 100, other agents (including the cyclist 118), and encoded lane boundaries. The CNN 406 may learn all such information from the environment data 404. For the scenario of passing by a cyclist 118, human drivers may often drive away from the cyclist 118, pass by the cyclist 118 which may be slightly going over the left lane boundary, and then drive back into the lane 114. The CNN 406 may learn such behavior indicating that the vehicle 100 should pass the cyclist 118 relatively far away even if it is slightly over the left lane boundary. As a result, one may want to lower the cost from the initial cost volume 402 a bit for going over the left boundary because that may allow the vehicle 100 to efficiently pass by the cyclist 118 with perceived safety and elegance. For such purpose, the CNN 406 may determine adjustments to the initial cost volume 402, i.e., a delta cost volume 408. By combining the delta cost volume 408 with the initial cost volume 402, the computing system may generate the finalized cost volume 410 that decreases the cost for the trajectory 122 going over the left boundary but increases the cost for the trajectory 120 close to the cyclist 118. Therefore, such trajectory may get as close as possible to a human driving trajectory.

In particular embodiments, the computing system may train the machine-learning model based on a plurality of training data indicative of the observed driving behavior. The plurality of training data indicative of observed driving behavior may comprise captured sensor data comprising images, videos, LiDAR point clouds, radar signals, or any combination thereof. The training process may be illustrated by the following example. The computing system may generate a plurality of trajectories for a certain driving environment. On the other hand, there may be a predetermined trajectory, e.g., a human driving trajectory associated with the environment that is considered as the best trajectory. The machine-learning model may comprise a delta cost function. Based on the initial cost volume 402 and the training data, the computing system may determine a predicted delta cost volume 408 using the machine-learning model. The computing system may then select a trajectory from the plurality of trajectories based on the initial cost volume 402 and the predicted delta cost volume 408. Specifically, this may comprise applying the predicted delta cost volume 408 to the initial cost volume 402 to generate a temporary finalized cost volume 410. Using the temporary finalized cost volume 410, the computing system may figure out which is the best trajectory, i.e., the one having the lowest cost. The computing system may then compare the selected trajectory with the predetermined trajectory to calculate a difference. The computing system may further update the machine-learning model based on the comparison. The difference may be back propagated to the machine-learning model to optimize it. As an example and not by way of limitation, the difference may be fed into the delta cost function, which may output a loss. The computing system may then determine if the loss is minimized, which may be based on several iterations. For example, in the t-th iteration, the loss may be compared with the loss in the previous (t−1)-th iteration. If the loss in the t-th iteration is greater than the loss in the (t−1)-th iteration, the computing system may update the parameters of the machine-learning model. The training may continue to the (t+1)-th iteration. In the (t+1)-th iteration, the computing system may update the predicted delta cost volume 408 using the updated machine-learning model, re-select a trajectory based on the initial cost volume 402 and the updated predicted delta cost volume 408, calculate the difference between the re-selected trajectory and the predetermined trajectory, output a loss based on the difference, and compare the loss with the loss in the t-th iteration. If the loss in the (t+1)-th iteration is smaller than or equal to the loss in the t-th iteration, the computing system may end the training with the machine-learning model as optimized. If the loss in the (t+1)-th iteration is still greater than the loss in the t-th iteration, the training process may proceed with additional iterations until the loss is minimized.

Figure 5A:
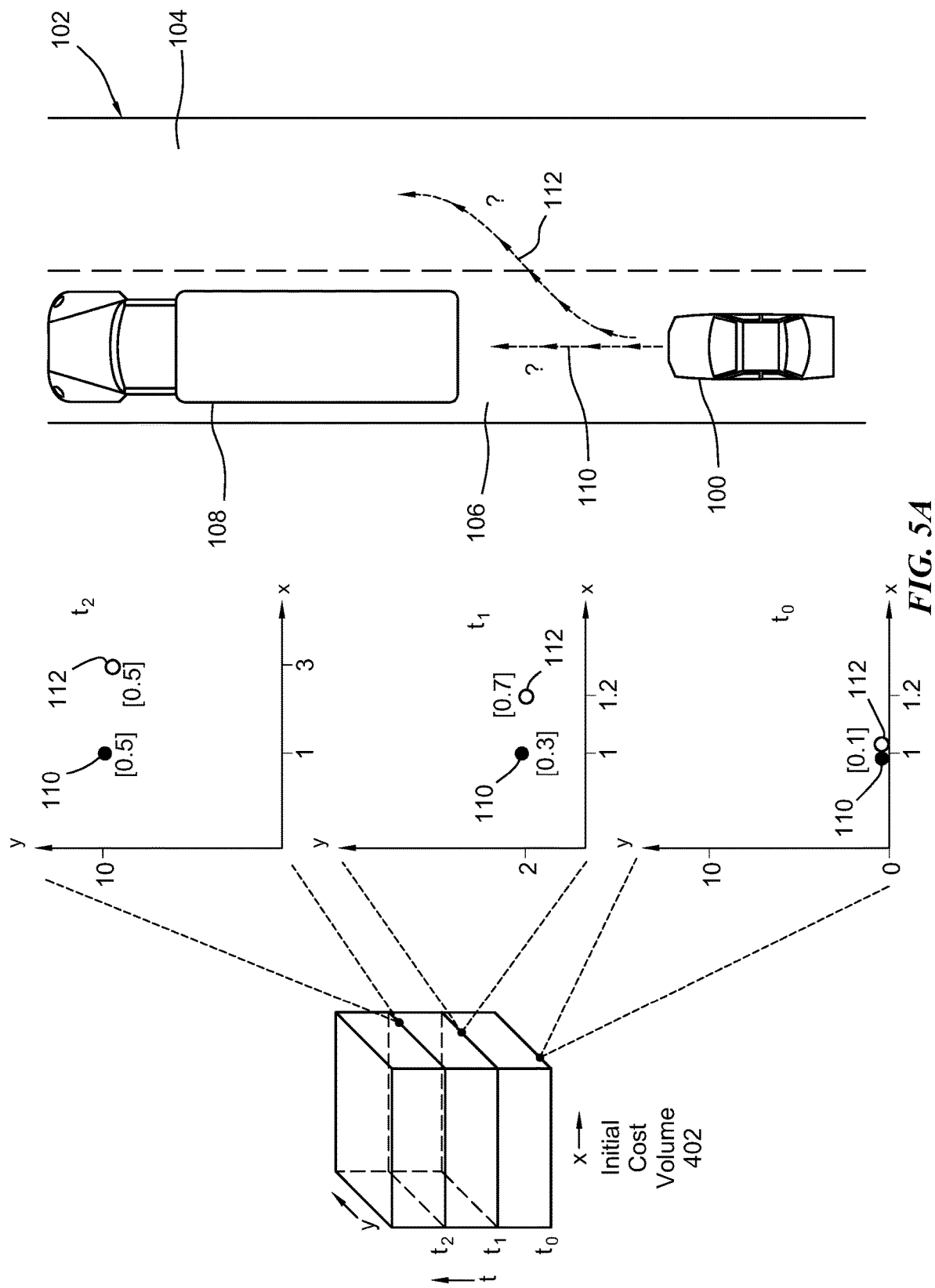
FIG. 5A illustrates an example of a cost comparison between two trajectories using the initial cost volume for the scenario in FIG. 1A.

FIGS. 5A-5D illustrate example cost comparisons between two trajectories using the initial cost volume 402 for the scenarios in FIGS. 1A-1D. x-axis indicates the lateral direction, y-axis indicates the vertical direction, and t indicates time. FIG. 5A illustrates an example cost comparison between two trajectories using the initial cost volume 402 for the scenario in FIG. 1A. Time to may be the starting point where the computing system needs to determine a cost for each potential trajectory. Therefore, both trajectory 110 and trajectory 112 may be at the same location and their cost may be both 0.1. As an example and not by way of limitation, the computing system may check a lookup table similar to the slice 302 in FIG. 3. The computing system may identify the location for both trajectories and then get the initial cost measurement for that location. At time $t_1$, trajectory 110 may keep straight whereas trajectory 112 may be moving towards the right to change to the right lane 104. According to the initial cost volume 402, the cost for trajectory 110 may be 0.3 and that for trajectory 112 may be 0.7 (i.e., the cost is high during the process of lane changing). As an example and not by way of limitation, the computing system may check a lookup table similar to the slice 304 in FIG. 3. The computing system may identify the locations for both trajectories and then get the initial cost measurements for the respective locations of the two trajectories. At time $t_2$, trajectory 110 may still keep straight whereas trajectory 112 may be completing the lane change. According to the initial cost volume 402, the cost for trajectory 110 may be 0.5 and that for trajectory 112 may also be 0.5 (the lane change is completed and the vehicle 100 is again in the middle of a lane so the cost decreases). The comparison may be a result of the initial cost volume 402 being generated based on movement restrictions that a vehicle 100 should try to stay in a lane and avoid lane changing.

Figure 5B:
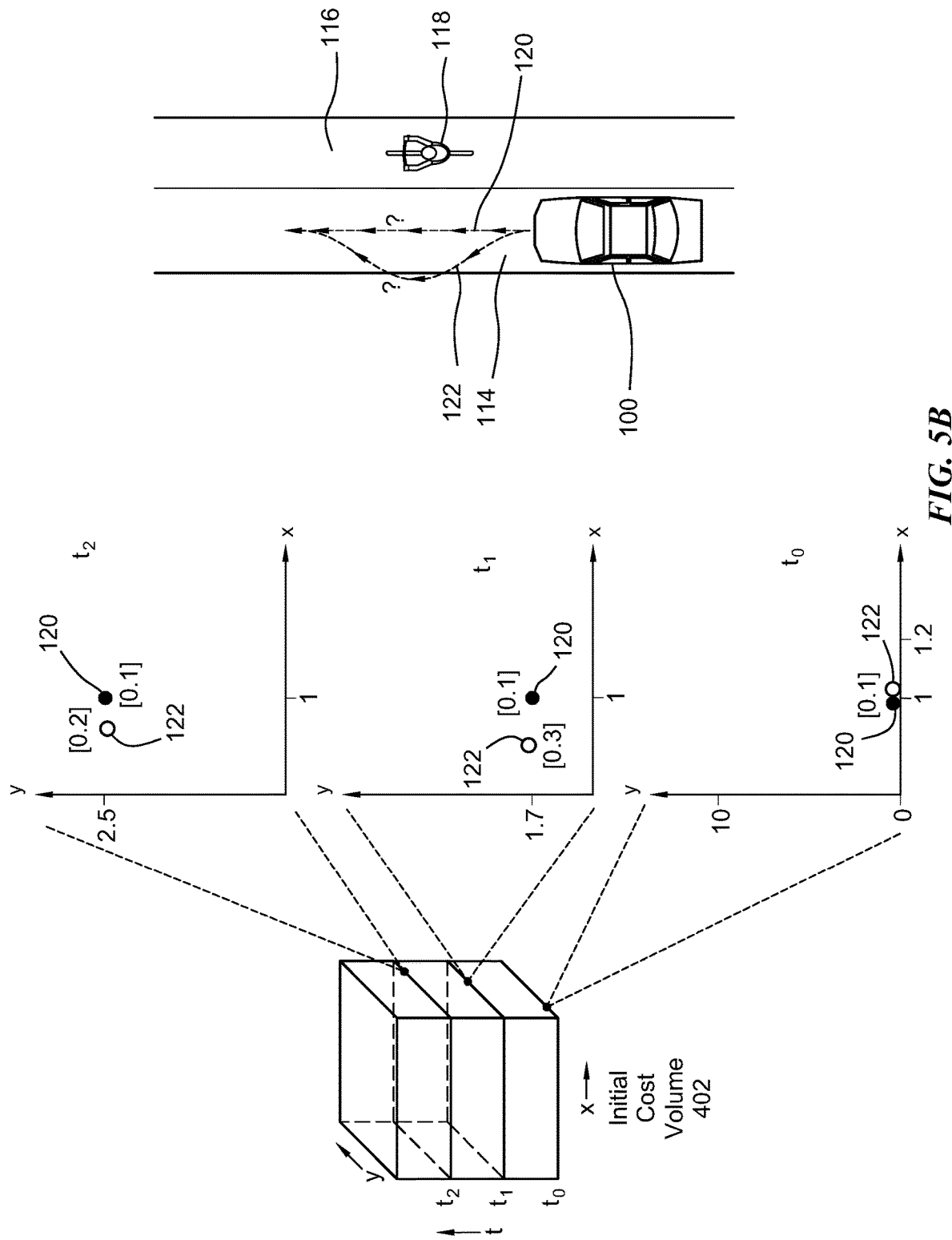
FIG. 5B illustrates an example of a cost comparison between two trajectories using the initial cost volume for the scenario in FIG. 1B.

FIG. 5B illustrates an example cost comparison between two trajectories using the initial cost volume 402 for the scenario in FIG. 1B. Time to may be the starting point where the computing system needs to determine a cost for each potential trajectory for passing by a cyclist 118. Therefore, both trajectory 120 and trajectory 122 may be at the same location and their cost may be both 0.1. At time $t_1$, trajectory 120 may keep straight whereas trajectory 122 may be moving towards the left even a bit over the left boundary. According to the initial cost volume 402, the cost for trajectory 120 may be 0.1 and that for trajectory 122 may be 0.3 (i.e., the cost is high because the vehicle 100 passes the left lane boundary). At time $t_2$, trajectory 120 may still keep straight whereas trajectory 120 may be moving towards the right going back to the middle of the lane 114. According to the initial cost volume 402, the cost for trajectory 120 may be 0.1 and that for trajectory 122 may be 0.2 (the vehicle 100 is again within the lane boundaries so the cost decreases). Note that both costs may decrease, which may be because of the vehicle 100 having passed by the cyclist 118. The comparison may be a result from the initial cost volume 402 being generated based on movement restrictions that a vehicle 100 should try to stay in lane and should not cross lane boundaries.

Figure 5C:
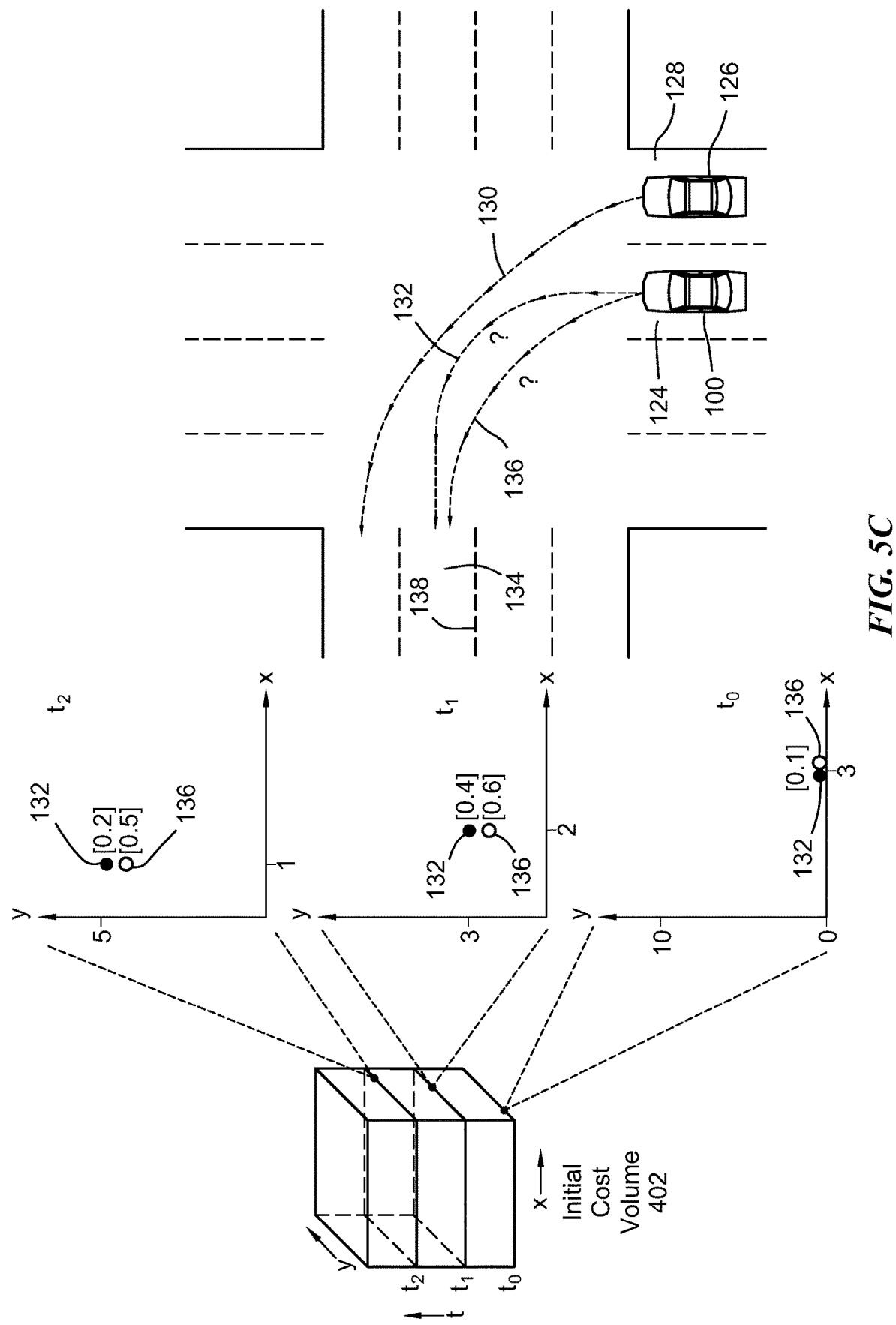
FIG. 5C illustrates an example of a cost comparison between two trajectories using the initial cost volume for the scenario in FIG. 1C.

FIG. 5C illustrates an example cost comparison between two trajectories using the initial cost volume 402 for the scenario in FIG. 1C. Time to may be the starting point where the computing system needs to determine a cost for each potential trajectory for making a left turn. Therefore, both trajectory 132 and trajectory 136 may be at the same location and their cost may be both 0.1. At time $t_1$, according to the initial cost volume 402, the cost for trajectory 132 may be 0.4 and that for trajectory 136 may be 0.6. At time $t_2$, trajectory 132 may end up at the middle of the lane 134 whereas trajectory 136 may end up closer to the lane divider 138. According to the initial cost volume 402, the cost for trajectory 132 may be 0.2 and that for trajectory 136 may be 0.5. The comparison may be a result from the initial cost volume 402 being generated based on movement restrictions that when making a left turn, a vehicle 100 should try to end up in the middle of the target lane. The movement restrictions may overlook the situation that there is another vehicle 126 also turning left and its potential trajectory 130 may pose a certain degree of risk for vehicle 100.

Figure 5D:
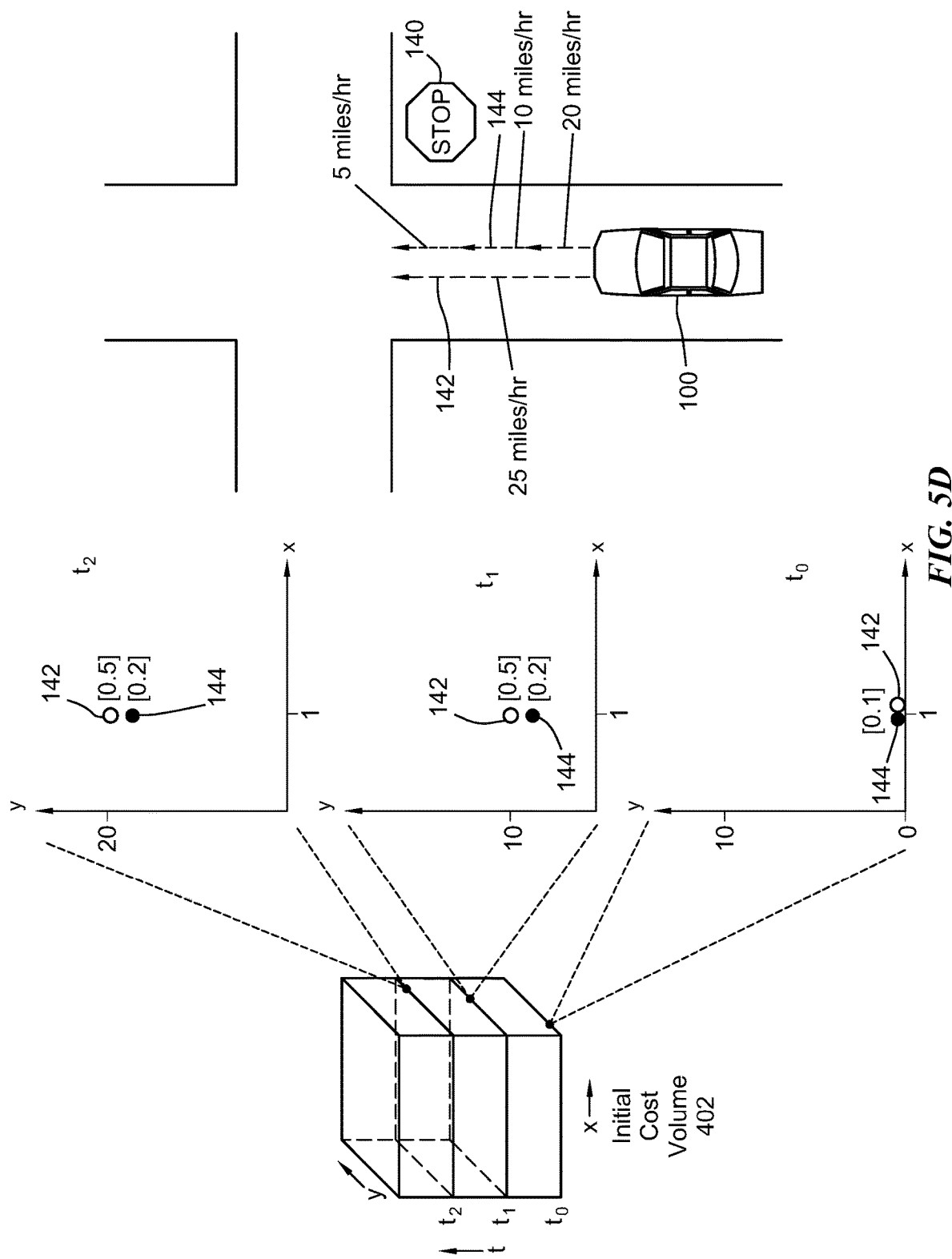
FIG. 5D illustrates an example of a cost comparison between two trajectories using the initial cost volume for the scenario in FIG. 1D.

FIG. 5D illustrates an example cost comparison between two trajectories using the initial cost volume 402 for the scenario in FIG. 1D. Time to may be the starting point where the computing system needs to determine a cost for each potential trajectory for approaching a stop sign 140. Therefore, both trajectory 142 and trajectory 144 may be at the same location and their cost may be both 0.1. At time $t_1$, trajectory 144 may reduce the velocity whereas trajectory 142 may keep the original velocity. According to the initial cost volume 402, the cost for trajectory 144 may be 0.2 and that for trajectory 142 may be 0.5. At time $t_2$, trajectory 144 may continue reducing the velocity whereas trajectory 142 may continue with the original velocity. According to the initial cost volume 402, the cost for trajectory 144 may be 0.2 and that for trajectory 142 may be 0.5. The comparison may be a result from the initial cost volume 402 being generated based on movement restrictions that a vehicle 100 should start slowing down earlier in time when approaching the stop sign 140. The initial cost volume 402 may penalize approaching the stop sign 140 too fast.

Figure 6A:
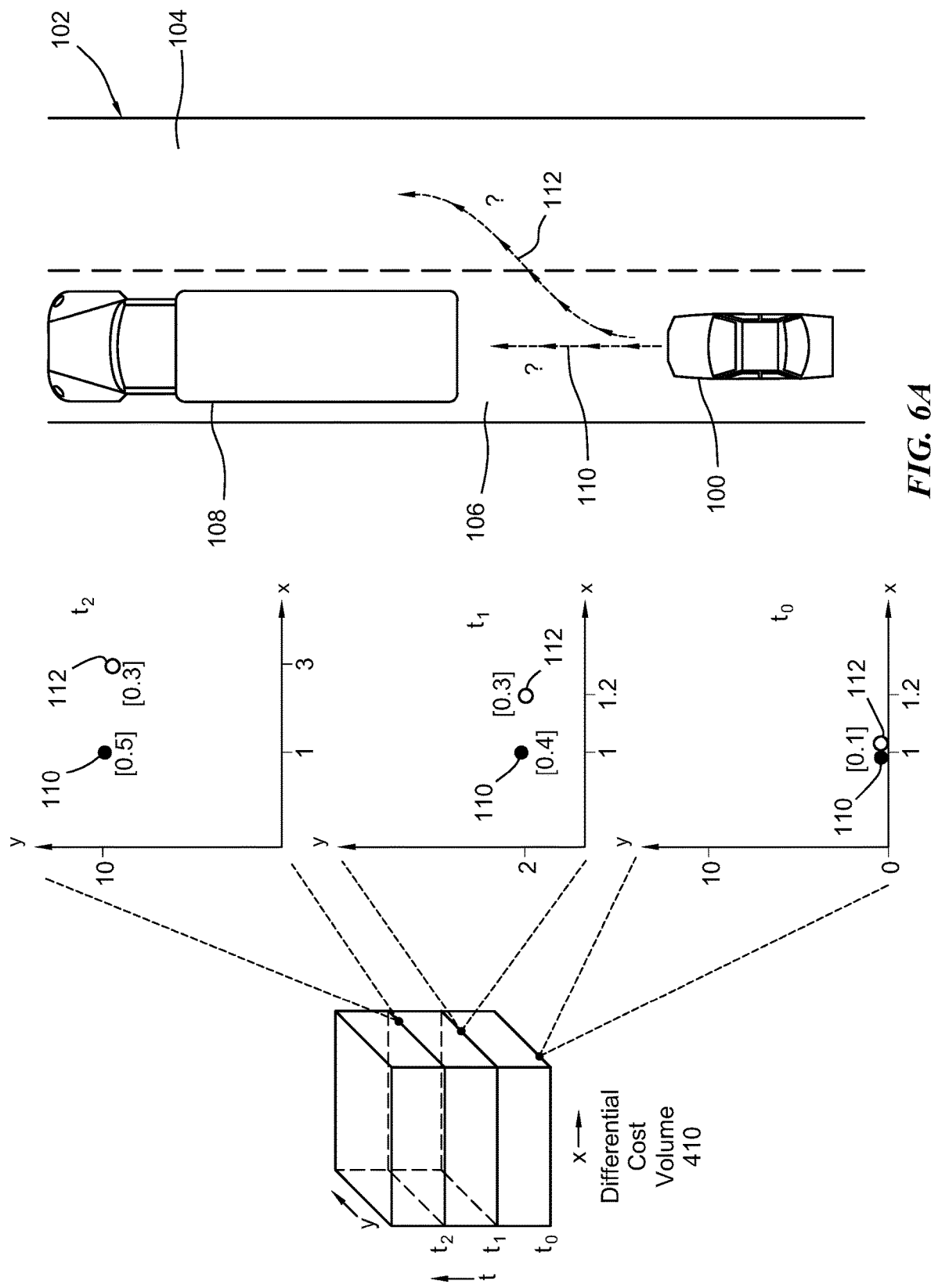
FIG. 6A illustrates an example of a cost comparison between two trajectories using the differential cost volume for the scenario in FIG. 1A.

FIGS. 6A-6D illustrate example cost comparisons between two trajectories using the finalized cost volume 410 for the scenarios in FIGS. 1A-1D. x-axis indicates the lateral direction, y-axis indicates the vertical direction, and t indicates time. FIG. 6A illustrates an example cost comparison between two trajectories using the finalized cost volume 410 for the scenario in FIG. 1A. Time to may be the starting point where the computing system needs to determine a cost for each potential trajectory. Therefore, both trajectory 110 and trajectory 112 may be at the same location and their cost may be both 0.1. As an example and not by way of limitation, the computing system may check a lookup table similar to the slice 306 in FIG. 3. The computing system may identify the location for both trajectories and then get the finalized cost measurement for that location. At time $t_1$, trajectory 110 may keep straight whereas trajectory 112 may be moving towards the right to change to the right lane 104. According to the differential finalized cost volume 410, the cost for trajectory 110 may be 0.4 and that for trajectory 112 may be 0.3. As an example and not by way of limitation, the computing system may check a lookup table similar to the slice 308 in FIG. 3. The computing system may identify the locations for both trajectories and then get the finalized cost measurements for the respective locations of the two trajectories. The cost of trajectory 112 being lower than that of trajectory 110 may be due to the adjustments to the initial cost volume 402 encouraging changing lanes when following a cargo truck 108. Such adjustments may be learned from observed driving behavior which indicates that human drivers usually avoid following cargo trucks 108 closely and make lane changes to have a better field of view. At time $t_2$, trajectory 110 may still keep straight whereas trajectory 112 may be moving towards the right to change to the right lane 104. According to the finalized cost volume 410, the cost for trajectory 110 may be 0.5 and that for trajectory 112 may be 0.3. This may be due to the adjustments to the initial cost volume 402 to reduce the cost for changing a lane when following a cargo truck 108. The finalized cost volume 410 may be generated based on both initial cost volume 402 and observed driving behavior, thereby having the advantage of guaranteeing safety as well as elegance.

Figure 6B:
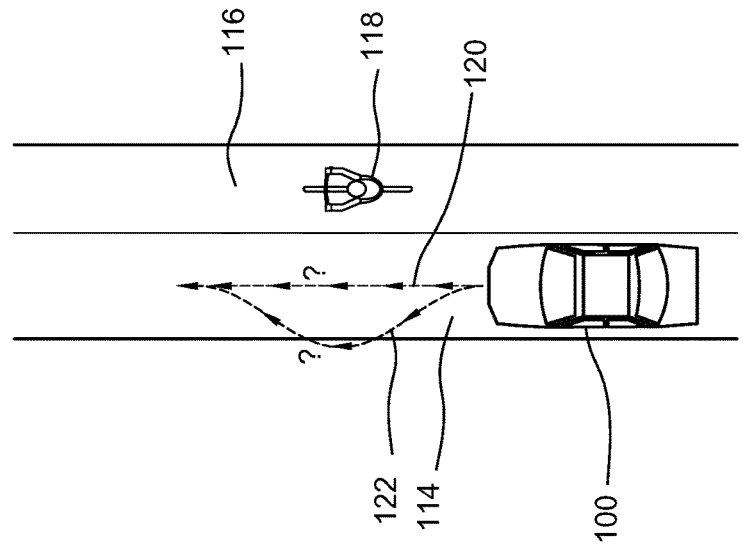
FIG. 6B illustrates an example of a cost comparison between two trajectories using the differential cost volume for the scenario in FIG. 1B.
Figure 6B:
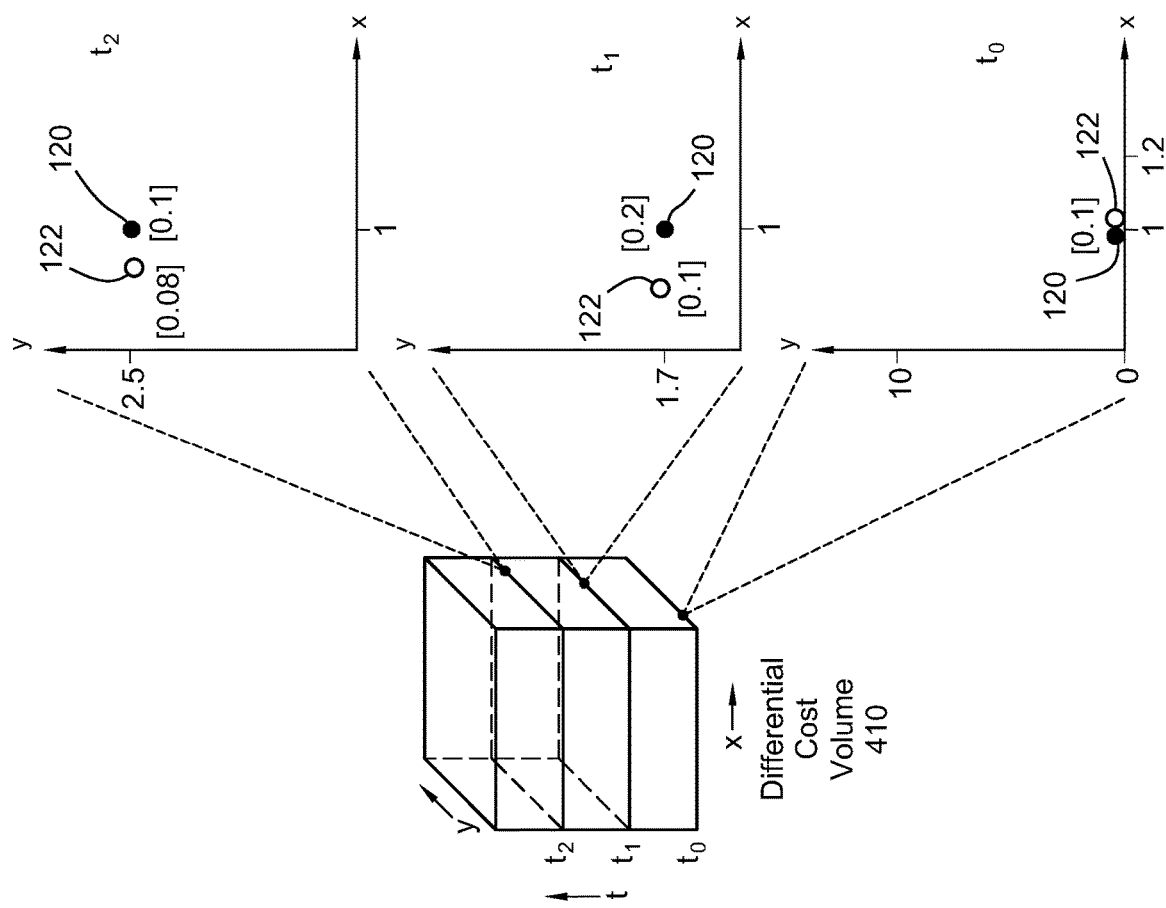

FIG. 6B illustrates an example cost comparison between two trajectories using the finalized cost volume 410 for the scenario in FIG. 1B. Time to may be the starting point where the computing system needs to determine a cost for each potential trajectory for passing by a cyclist 118. Therefore, both trajectory 120 and trajectory 122 may be at the same location and their cost may be both 0.1. At time $t_1$, trajectory 120 may keep straight whereas trajectory 120 may be moving towards the left even a bit over the left boundary. According to the finalized cost volume 410, the cost for trajectory 120 may be 0.2 and that for trajectory 122 may be 0.1. This may be due to the adjustments to the initial cost volume 402 encouraging the vehicle 100 to get further away from a cyclist 118 even if crossing over a lane boundary. The adjustments to the initial cost volume 402 may also penalize the vehicle 100 being too close to the cyclist 118. Such adjustments may be similarly learned from observed driving behavior. At time $t_2$, trajectory 120 may still keep straight whereas trajectory 122 may be moving towards the right going back to the middle of the lane 114. According to the finalized cost volume 410, the cost for trajectory 120 may be 0.1 and that for trajectory 122 may be 0.08. The finalized cost volume 410 may be generated based on both initial cost volume 402 and observed driving behavior, thereby having the advantage of guaranteeing safety as well as elegance.

Figure 6C:
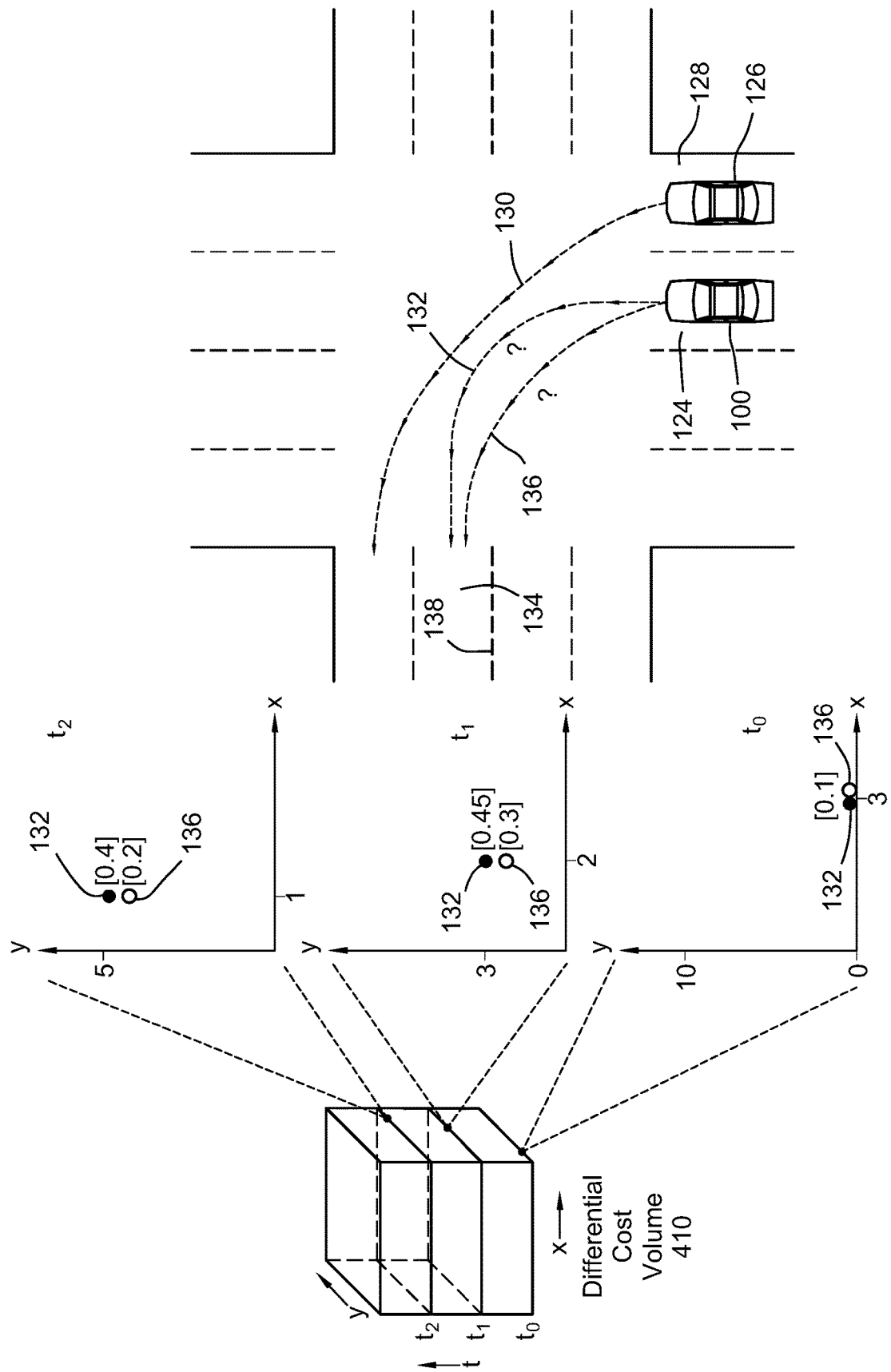
FIG. 6C illustrates an example of a cost comparison between two trajectories using the differential cost volume for the scenario in FIG. 1C.

FIG. 6C illustrates an example cost comparison between two trajectories using the finalized cost volume 410 for the scenario in FIG. 1C. Time to may be the starting point where the computing system needs to determine a cost for each potential trajectory for making a left turn. Therefore, both trajectory 132 and trajectory 136 may be at the same location and their cost may be both 0.1. At time $t_1$, according to the finalized cost volume 410, the cost for trajectory 132 may be 0.45 and that for trajectory 136 may be 0.3. At time $t_2$, trajectory 132 may end up at the middle of the lane 134 whereas trajectory 136 may end up closer to the lane divider 138. According to the finalized cost volume 410, the cost for trajectory 132 may be 0.4 and that for trajectory 136 may be 0.2. The comparison may indicate that the adjustments to the initial cost volume 402 encourage the vehicle 100 to get further away from another vehicle 126 that is also turning left. The adjustments to the initial cost volume 402 may also penalize the vehicle 100 being close to the other vehicle 126 turning left. Such adjustments may be similarly learned from observed driving behavior since humans may usually keep a considerable distance from another vehicle whenever it is possible given it is safe and does not violate traffic rules to do so. As a result, the finalized cost volume 410 may have the advantage of guaranteeing safety as well as elegance.

Figure 6D:
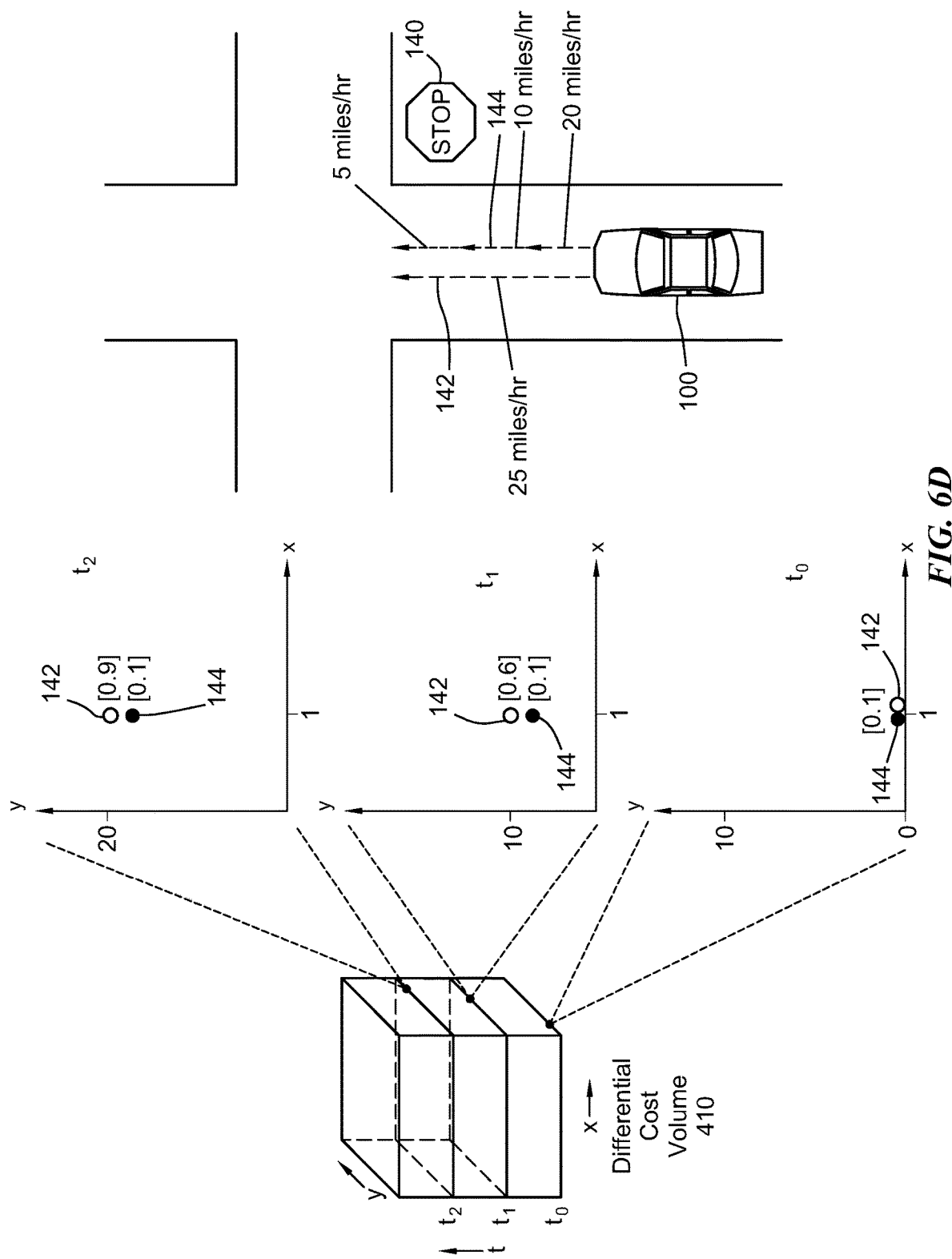
FIG. 6D illustrates an example of a cost comparison between two trajectories using the differential cost volume for the scenario in FIG. 1D.

FIG. 6D illustrates an example cost comparison between two trajectories using the finalized cost volume 410 for the scenario in FIG. 1D. Time $t_0$ may be the starting point where the computing system needs to determine a cost for each potential trajectory for approaching a stop sign 140. Therefore, both trajectory 142 and trajectory 144 may be at the same location and their cost may be both 0.1. At time $t_1$, trajectory 144 may reduce the velocity whereas trajectory 142 may keep the original velocity. According to the finalized cost volume 410, the cost for trajectory 144 may be 0.1 and that for trajectory 142 may be 0.6. At time $t_2$, trajectory 144 may continue reducing the velocity whereas trajectory 142 may continue with the original velocity. According to the differential finalized cost volume 410, the cost for trajectory 144 may be 0.1 and that for trajectory 142 may be 0.9. The comparison may indicate that the adjustments to the initial cost volume 402 encourage the vehicle 100 to start slowing down earlier in time when approaching the stop sign 140. The adjustments to the initial cost volume 402 may further penalize approaching the stop sign 140 too fast, which is reflected by the costs of trajectory 142 even higher than those from the initial cost volume 402. As can be seen, the finalized cost volume 410 may be consistent with the initial cost volume 402 regarding evaluating the way of approaching the stop sign 140. This may make sense since approaching the stop sign 140 with a gradually reduced velocity may be both specified by movement restrictions and reflected by observed driving behavior (i.e., human drivers often slow down when approaching a stop sign 140).

In particular embodiments, the computing system may score the plurality of remaining potential trajectories for the vehicle 100 based on the initial cost volume 402 and the delta cost volume 408. In other words, the computing system may score the potential trajectories using the finalized cost volume 410. The lower the cost is, the higher the score may be. In particular embodiments, scoring the trajectory of the vehicle 100 may comprise determining a cost for the trajectory. The determination may comprise the following steps. The computing system may first identify a plurality of candidate locations associated with a plurality of candidate timestamps for the trajectory from the plurality of locations associated with the plurality of timestamps. The computing system may then determine a plurality of finalized cost measurements corresponding to the plurality of candidate locations associated with the plurality of candidate timestamps for the trajectory. The computing system may further determine the cost for the trajectory based on the plurality of finalized cost measurements. In particular embodiments, the computing system may then rank the plurality of potential trajectories based on their respective scores. The computing system may further, using the respective score, select a top-ranked potential trajectory from the plurality of potential trajectories as a planned trajectory for the vehicle 100. Taking the scenarios in FIGS. 6A-6D as examples, the computing system may determine a planned trajectory as follows. For the scenario in FIG. 6A, the computing system may use the finalized cost volume 410 to score trajectory 110 and trajectory 112. The computing system may select trajectory 112 as a planned trajectory based on its score being higher than that of trajectory 110, which indicates that the vehicle 100 should change the lane to avoid following the cargo truck 108. For the scenario in FIG. 6B, the computing system may use the finalized cost volume 410 to score the trajectory 120 and trajectory 122. The computing system may select trajectory 122 as a planned trajectory based on its score being higher than that of trajectory 120, which indicates that the vehicle 100 should drive further away from the cyclist 118 even if it goes over the left boundary slightly. For the scenario in FIG. 6C, the computing system may use the finalized cost volume 410 to score trajectory 132 and trajectory 136. The computing system may select trajectory 136 as a planned trajectory based on its score being higher than that of trajectory 132, which indicates that the vehicle 100 should turn left with as much distance as possible to the other vehicle 126 which is also turning left. For the scenario in FIG. 6D, the computing system may use the finalized cost volume 410 to score trajectory 142 and trajectory 144. The computing system may select trajectory 144 as a planned trajectory based on its score being higher than that of trajectory 142, which indicates that the vehicle 100 should start slowing down earlier in time when approaching the stop sign 140.

Figure 7:
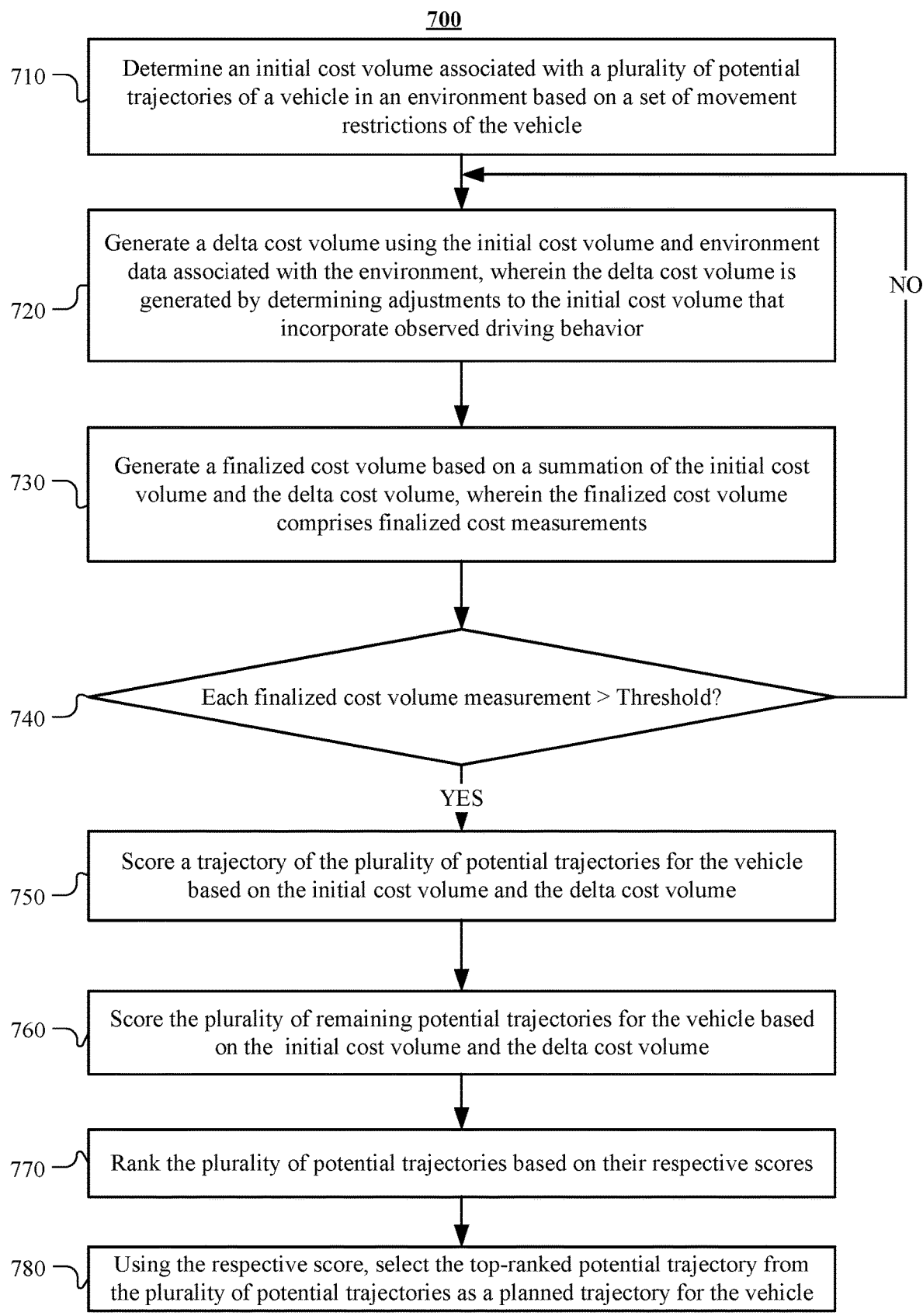
FIG. 7 illustrates an example of a method for determining a planned trajectory for a vehicle.

FIG. 7 illustrates an example method 700 for determining a planned trajectory for a vehicle. The method may begin at step 710, where a computing system may determine an initial cost volume 402 associated with a plurality of potential trajectories of a vehicle 100 in an environment based on a set of movement restrictions of the vehicle 100. At step 720, the computing system may generate a delta cost volume 408 using the initial cost volume 402 and environment data 404 associated with the environment, wherein the delta cost volume 408 is generated by determining adjustments to the initial cost volume 402 that incorporate observed driving behavior. At step 730, the computing system may generate a finalized cost volume 410 based on a summation of the initial cost volume 402 and the delta cost volume 408, wherein the finalized cost volume 410 comprises finalized cost measurements. At step 740, the computing system may determine if the delta cost volume 408 ensures each finalized cost measurement of the finalized cost volume 410 is greater than a threshold measurement. If not all the finalized cost measurements are greater than the threshold measurement, the method may repeat step 720 to step 740. If each finalized cost measurement of the finalized cost volume 410 is greater than the threshold measurement, the method may proceed to step 750. At step 750, the computing system may score a trajectory of the plurality of potential trajectories for the vehicle 100 based on the initial cost volume 402 and the delta cost volume 408. At step 760, the computing system may score the plurality of remaining potential trajectories for the vehicle 100 based on the initial cost volume 402 and the delta cost volume 408. At step 770, the computing system may rank the plurality of potential trajectories based on their respective scores. At step 780, the computing system may, using the respective score, select the top-ranked potential trajectory from the plurality of potential trajectories as a planned trajectory for the vehicle 100. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining a planned trajectory for a vehicle including the particular steps of the method of FIG. 7, this disclosure contemplates any suitable method for determining a planned trajectory for a vehicle including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
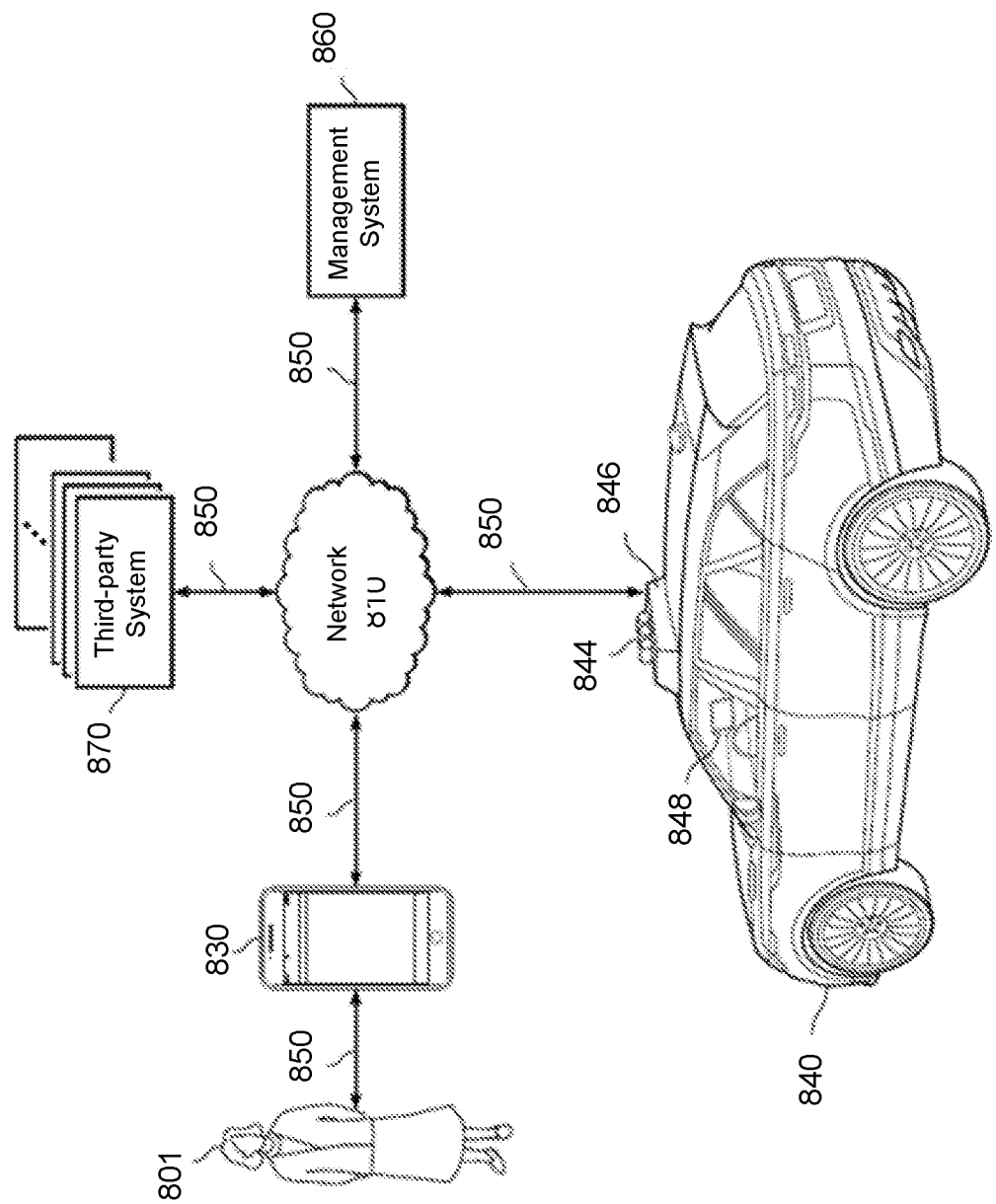
FIG. 8 illustrates an example of a block diagram of a transportation management environment for matching ride requestors with autonomous vehicles.

FIG. 8 illustrates an example block diagram of a transportation management environment for matching ride requestors with autonomous vehicles. In particular embodiments, the environment may include various computing entities, such as a user device 830 of a user 801 (e.g., a ride provider or requestor), a transportation management system 860, an autonomous vehicle 840, and one or more third-party system 870. The computing entities may be communicatively connected over any suitable network 810. As an example and not by way of limitation, one or more portions of network 810 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 8 illustrates a single user device 830, a single transportation management system 860, a single vehicle 840, a plurality of third-party systems 870, and a single network 810, this disclosure contemplates any suitable number of each of these entities. As an example and not by way of limitation, the network environment may include multiple users 801, user devices 830, transportation management systems 860, autonomous-vehicles 840, third-party systems 870, and networks 810.

The user device 830, transportation management system 860, autonomous vehicle 840, and third-party system 870 may be communicatively connected or co-located with each other in whole or in part. These computing entities may communicate via different transmission technologies and network types. For example, the user device 830 and the vehicle 840 may communicate with each other via a cable or short-range wireless communication (e.g., Bluetooth, NFC, WI-FI, etc.), and together they may be connected to the Internet via a cellular network that is accessible to either one of the devices (e.g., the user device 830 may be a smartphone with LTE connection). The transportation management system 860 and third-party system 870, on the other hand, may be connected to the Internet via their respective LAN/WLAN networks and Internet Service Providers (ISP). FIG. 8 illustrates transmission links 850 that connect user device 830, autonomous vehicle 840, transportation management system 860, and third-party system 870 to communication network 810. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 810, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, the user device 830 may communicate with the transportation management system via a cellular network and the Internet, but communicate with the autonomous vehicle 840 via Bluetooth or a physical wire connection.

In particular embodiments, the transportation management system 860 may fulfill ride requests for one or more users 801 by dispatching suitable vehicles. The transportation management system 860 may receive any number of ride requests from any number of ride requestors. In particular embodiments, a ride request from a ride requestor may include an identifier that identifies the ride requestor in the system 860. The transportation management system 860 may use the identifier to access and store the ride requestor's information, in accordance with the requestor's privacy settings. The ride requestor's information may be stored in one or more data stores (e.g., a relational database system) associated with and accessible to the transportation management system 860. In particular embodiments, ride requestor information may include profile information about a particular ride requestor. In particular embodiments, the ride requestor may be associated with one or more categories or types, through which the ride requestor may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, etc.), entertainment preferences and settings (e.g., preferred music genre or playlist, audio volume, display brightness, etc.), temperature settings, whether a conversation with the driver is welcomed, frequent destinations, historical riding patterns (e.g., time of day of travel, starting and ending locations, etc.), preferred language, age, gender, or any other suitable information. In particular embodiments, the transportation management system 860 may classify a user 801 based on known information about the user 801 (e.g., using machine-learning classifiers), and use the classification to retrieve relevant aggregate information associated with that class. For example, the system 860 may classify a user 801 as a young adult and retrieve relevant aggregate information associated with young adults, such as the type of music generally preferred by young adults.

Transportation management system 860 may also store and access ride information. Ride information may include locations related to the ride, traffic data, route options, optimal pick-up or drop-off locations for the ride, or any other suitable information associated with a ride. As an example and not by way of limitation, when the transportation management system 860 receives a request to travel from San Francisco International Airport (SFO) to Palo Alto, Calif., the system 860 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 860. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 860. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 860 in particular embodiments may predict and provide ride suggestions in response to a ride request. In particular embodiments, the system 860 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 860 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 860 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 830 (which may belong to a ride requestor or provider), a transportation management system 860, vehicle 840, or a third-party system 870 to process, transform, manage, retrieve, modify, add, or delete the information stored in the data store.

In particular embodiments, transportation management system 860 may include an authorization server (or any other suitable component(s)) that allows users 801 to opt-in to or opt-out of having their information and actions logged, recorded, or sensed by transportation management system 860 or shared with other systems (e.g., third-party systems 870). In particular embodiments, a user 801 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 801 of transportation management system 860 through blocking, data hashing, anonymization, or other suitable techniques as appropriate.

In particular embodiments, third-party system 870 may be a network-addressable computing system that may provide HD maps or host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 810. For example, user device 830 may access the third-party system 870 via network 810, or via transportation management system 860. In the latter case, if credentials are required to access the third-party system 870, the user 801 may provide such information to the transportation management system 860, which may serve as a proxy for accessing content from the third-party system 870.

In particular embodiments, user device 830 may be a mobile computing device such as a smartphone, tablet computer, or laptop computer. User device 830 may include one or more processors (e.g., CPU and/or GPU), memory, and storage. An operating system and applications may be installed on the user device 830, such as, e.g., a transportation application associated with the transportation management system 860, applications associated with third-party systems 870, and applications associated with the operating system. User device 830 may include functionality for determining its location, direction, or orientation, based on integrated sensors such as GPS, compass, gyroscope, or accelerometer. User device 830 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 830 may also include one or more cameras, scanners, touchscreens, microphones, speakers, and any other suitable input-output devices.

In particular embodiments, the vehicle 840 may be an autonomous vehicle and equipped with an array of sensors 844, a navigation system 846, and a ride-service computing device 848. In particular embodiments, a fleet of autonomous vehicles 840 may be managed by the transportation management system 860. The fleet of autonomous vehicles 840, in whole or in part, may be owned by the entity associated with the transportation management system 860, or they may be owned by a third-party entity relative to the transportation management system 860. In either case, the transportation management system 860 may control the operations of the autonomous vehicles 840, including, e.g., dispatching select vehicles 840 to fulfill ride requests, instructing the vehicles 840 to perform select operations (e.g., head to a service center or charging/fueling station, pull over, stop immediately, self-diagnose, lock/unlock compartments, change music station, change temperature, and any other suitable operations), and instructing the vehicles 840 to enter select operation modes (e.g., operate normally, drive at a reduced speed, drive under the command of human operators, and any other suitable operational modes).

In particular embodiments, the autonomous vehicles 840 may receive data from and transmit data to the transportation management system 860 and the third-party system 870. Examples of received data may include, e.g., instructions, new software or software updates, maps, 3D models, trained or untrained machine-learning models, location information (e.g., location of the ride requestor, the autonomous vehicle 840 itself, other autonomous vehicles 840, and target destinations such as service centers), navigation information, traffic information, weather information, entertainment content (e.g., music, video, and news) ride requestor information, ride information, and any other suitable information. Examples of data transmitted from the autonomous vehicle 840 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 840, passengers may send/receive data to the transportation management system 860 and/or third-party system 870), and any other suitable data.

In particular embodiments, autonomous vehicles 840 may also communicate with each other as well as other traditional human-driven vehicles, including those managed and not managed by the transportation management system 860. For example, one vehicle 840 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 860 or third-party system 870).

In particular embodiments, an autonomous vehicle 840 may obtain and process sensor/telemetry data. Such data may be captured by any suitable sensors. For example, the vehicle 840 may have a Light Detection and Ranging (LiDAR) sensor array of multiple LiDAR transceivers that are configured to rotate 360°, emitting pulsed laser light and measuring the reflected light from objects surrounding vehicle 840. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 840. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 840 may have optical cameras pointing in different directions. The cameras may be used for, e.g., recognizing roads, lane markings, street signs, traffic lights, police, other vehicles, and any other visible objects of interest. To enable the vehicle 840 to "see" at night, infrared cameras may be installed. In particular embodiments, the vehicle may be equipped with stereo vision for, e.g., spotting hazards such as pedestrians or tree branches on the road. As another example, the vehicle 840 may have radars for, e.g., detecting other vehicles and/or hazards afar. Furthermore, the vehicle 840 may have ultrasound equipment for, e.g., parking and obstacle detection. In addition to sensors enabling the vehicle 840 to detect, measure, and understand the external world around it, the vehicle 840 may further be equipped with sensors for detecting and self-diagnosing the vehicle's own state and condition. For example, the vehicle 840 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 840 may build a 3D model of its surrounding based on data from its LiDAR, radar, sonar, and cameras, along with a pre-generated map obtained from the transportation management system 860 or the third-party system 870. Although sensors 844 appear in a particular location on autonomous vehicle 840 in FIG. 8, sensors 844 may be located in any suitable location in or on autonomous vehicle 840. Example locations for sensors include the front and rear bumpers, the doors, the front windshield, on the side panel, or any other suitable location.

In particular embodiments, the autonomous vehicle 840 may be equipped with a processing unit (e.g., one or more CPUs and GPUs), memory, and storage. The vehicle 840 may thus be equipped to perform a variety of computational and processing tasks, including processing the sensor data, extracting useful information, and operating accordingly. For example, based on images captured by its cameras and a machine-vision model, the vehicle 840 may identify particular types of objects captured by the images, such as pedestrians, other vehicles, lanes, curbs, and any other objects of interest.

In particular embodiments, the autonomous vehicle 840 may have a navigation system 846 responsible for safely navigating the autonomous vehicle 840. In particular embodiments, the navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control the vehicle 840 to operate in prescribed manners and to guide the autonomous vehicle 840 to its destinations without colliding into other objects. Although the physical embodiment of the navigation system 846 (e.g., the processing unit) appears in a particular location on autonomous vehicle 840 in FIG. 8, navigation system 846 may be located in any suitable location in or on autonomous vehicle 840. Example locations for navigation system 846 include inside the cabin or passenger compartment of autonomous vehicle 840, near the engine/battery, near the front seats, rear seats, or in any other suitable location.

In particular embodiments, the autonomous vehicle 840 may be equipped with a ride-service computing device 848, which may be a tablet or any other suitable device installed by transportation management system 860 to allow the user to interact with the autonomous vehicle 840, transportation management system 860, other users 801, or third-party systems 870. In particular embodiments, installation of ride-service computing device 848 may be accomplished by placing the ride-service computing device 848 inside autonomous vehicle 840, and configuring it to communicate with the vehicle 840 via a wire or wireless connection (e.g., via Bluetooth). Although FIG. 8 illustrates a single ride-service computing device 848 at a particular location in autonomous vehicle 840, autonomous vehicle 840 may include several ride-service computing devices 848 in several different locations within the vehicle. As an example and not by way of limitation, autonomous vehicle 840 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 840. This may allow users to handle ride-service computing device 848 in a manner consistent with other tablet computing devices. As an example and not by way of limitation, a user may move ride-service computing device 848 to any location in the cabin or passenger compartment of autonomous vehicle 840, may hold ride-service computing device 848, or handle ride-service computing device 848 in any other suitable manner. Although this disclosure describes providing a particular computing device in a particular manner, this disclosure contemplates providing any suitable computing device in any suitable manner.

Figure 9:
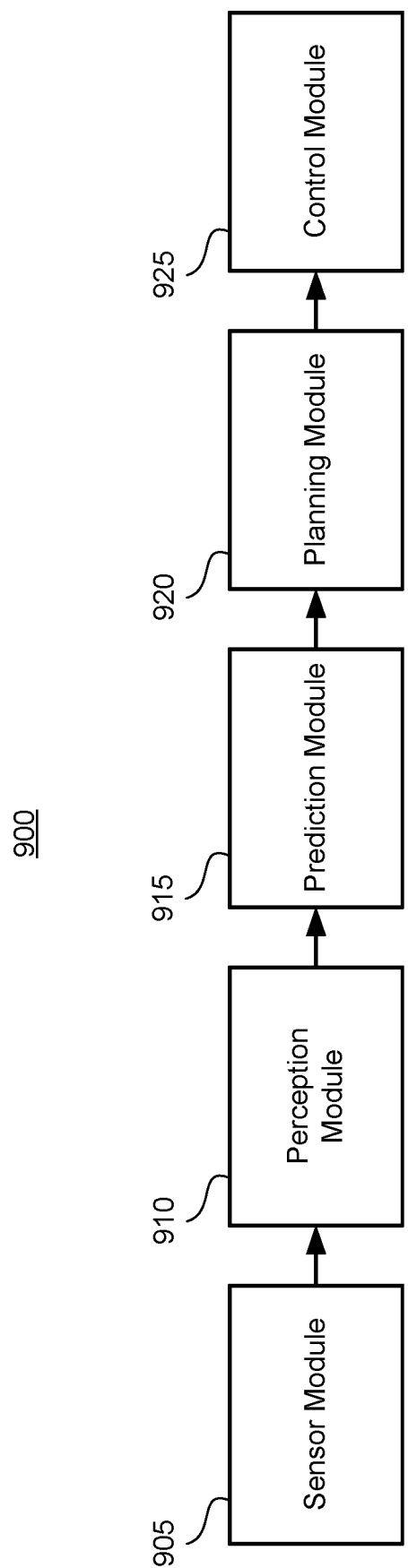
FIG. 9 illustrates an example of a processing pipeline for autonomous driving.

FIG. 9 illustrates an example block diagram of an algorithmic navigation pipeline. In particular embodiments, an algorithmic navigation pipeline 900 may include a number of computing modules, such as a sensor data module 905, perception module 910, prediction module 915, planning module 920, and control module 925. Sensor data module 905 may obtain and pre-process sensor/telemetry data that is provided to perception module 910. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding a vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 905 may suppress noise in the sensor data or normalize the sensor data.

Perception module 910 is responsible for correlating and fusing the data from the different types of sensors of the sensor data module 905 to model the contextual environment of the vehicle. Perception module 910 may use information extracted by multiple independent sensors to provide information that would not be available from any single type of sensors. Combining data from multiple sensor types allows the perception module 910 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 910 could use that additional information to determine that the object in the poster is not, in fact, a three-dimensional object.

Perception module 910 may process the available data (e.g., sensor data, data from a high-definition map, etc.) to derive information about the contextual environment. For example, perception module 910 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 910 may also determine various characteristics of the agents. For example, perception module 910 may track the velocities, moving directions, accelerations, trajectories, relative distances, or relative positions of these agents. In particular embodiments, the perception module 910 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 910 could determine the pose (e.g., position and orientation) of the vehicle or the poses of the vehicle's sensors within the high-definition map. The pose information, in turn, may be used by the perception module 910 to query the high-definition map and determine what objects are expected to be in the environment.

Perception module 910 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 910 may be consumed by a prediction module 915 to generate one or more predictions of the future environment. For example, given a representation of the contextual environment at time $t_0$, the prediction module 915 may output another contextual representation for time $t_1$. For instance, if the $t_0$ contextual environment is represented by a raster image, the output of the prediction module 915 may be another raster image (e.g., a snapshot of the current environment) that depicts where the agents would be at time $t_1$ (e.g., a snapshot of the future). In particular embodiments, prediction module 915 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times $t_0$ and $t_1$. The captured data at times $t_0$ and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation.

The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 920 may determine the navigation routes and particular driving operations (e.g., slowing down, speeding up, stopping, swerving, etc.) of the vehicle based on the predicted contextual representation generated by the prediction module 915. In particular embodiments, planning module 920 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 920 may determine a particular navigation path and associated driving operations for the vehicle to avoid possible collisions with one or more agents. In particular embodiments, planning module 920 may generate, based on a given predicted contextual presentation, several different plans (e.g., goals or navigation instructions) for the vehicle. For each plan, the planning module 920 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 920 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 920, which may include one or more navigation path or associated driving operations, control module 925 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 925 may transmit commands to a steering actuator to maintain a particular steering angle for a particular amount of time to move a vehicle on a particular trajectory to avoid agents predicted to encroach into the area of the vehicle. As another example, control module 925 may transmit commands to an accelerator actuator to have the vehicle safely avoid agents predicted to encroach into the area of the vehicle.

Figure 10:
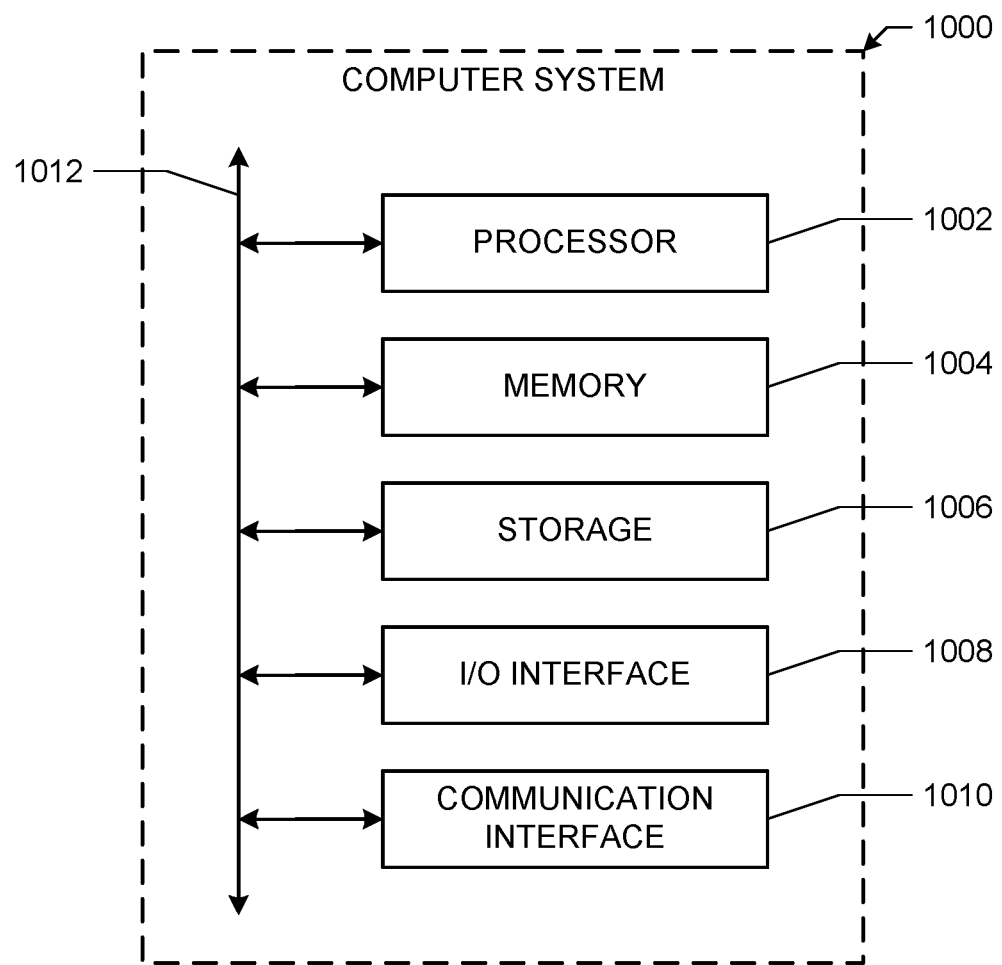
FIG. 10 illustrates an example of a computing system.

FIG. 10 illustrates an example computer system 1000. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining an initial cost volume associated with potential trajectories of a vehicle in an environment based on a set of movement restrictions of the vehicle, wherein the initial cost volume is based upon hand-engineered costs derived from the set of movement restrictions for the vehicle;
   generating, using a machine learning model, a delta cost volume using the initial cost volume and environment data of the environment, wherein the machine learning model is trained based upon observed driving behavior of vehicles;
   scoring a trajectory of the potential trajectories based on the initial cost volume and the delta cost volume;
   controlling the vehicle based upon the trajectory; and
   in response to computed measurements from the delta cost volume resulting in a finalized cost volume to satisfy a threshold measurement, adjusting the initial cost volume with the finalized cost volume associated with the potential trajectories, wherein the finalized cost volume comprises combining parts of the initial cost volume and the delta cost volume.

2. The method of claim 1, further comprising:
   scoring remaining potential trajectories in the potential trajectories based on the initial cost volume and the delta cost volume;
   ranking the remaining potential trajectories based on their respective scores; and
   selecting a top-ranked potential trajectory from the potential trajectories as the trajectory.

3. The method of claim 1, further comprising:
   generating the environment data by rasterizing one or more top-down images of the vehicle and agents around the vehicle in the environment.

4. The method of claim 3, wherein the environment data comprises information comprising one or more of:
   distances between the vehicle and the agents;
   lane boundaries associated with the environment;
   velocities of the vehicle and the agents;
   driving directions of the vehicle and the agents;
   yield relationships between the vehicle and the agents; or
   locations of the vehicle and the agents.

5. The method of claim 1, further comprising training the machine learning model based on training data indicative of the observed driving behavior, wherein training data indicative of the observed driving behavior comprises captured sensor data comprising one of images, videos, LiDAR point clouds, and radar signals.

6. The method of claim 5, wherein training the machine learning model comprises:
   generating trajectories;
   determining a predicted delta cost volume based on the initial cost volume and the training data;

selecting a second trajectory from the trajectories based on the initial cost volume and the predicted delta cost volume;

comparing the second trajectory with a predetermined trajectory; and updating the machine learning model based on the comparison.

7. The method of claim 1, wherein the initial cost volume comprises initial cost measurements at locations along each of the potential trajectories associated with timestamps.

8. The method of claim 7, wherein the finalized cost volume is an aggregated summation of the initial cost volume and the delta cost volume.

9. The method of claim 8, wherein the finalized cost volume comprises finalized cost measurements at the locations along each of the potential trajectories associated with the timestamps, and wherein each finalized cost measurement comprises an adjustment to an initial cost measurement.

10. The method of claim 9, further comprising:

determining that the delta cost volume ensures each finalized cost measurement of the finalized cost volume is greater than the threshold measurement.

11. The method of claim 9, further comprising:

embodying the initial cost volume into a three-dimensional lookup table having cells that are encoded with the initial cost measurement; and adjusting the three-dimensional lookup table based upon the delta cost volume such that the cells of the three-dimensional lookup table are encoded with the finalized cost measurements.

12. The method of claim 9, wherein scoring the trajectory of the vehicle comprises:

identifying candidate locations associated with candidate timestamps for the trajectory from the locations associated with the candidate timestamps;

determining the finalized cost measurements corresponding to the candidate locations associated with the candidate timestamps for the trajectory; and determining a cost for the trajectory based on the finalized cost measurements.

13. A system comprising: one or more processors and one or more computer-readable non-transitory storage media, the one or more computer-readable non-transitory storage media comprising instructions operable when executed by the one or more processors to cause the system to perform operations comprising:

determining an initial cost volume associated with potential trajectories of a vehicle in an environment based on a set of movement restrictions of the vehicle, wherein the initial cost volume is based upon hand-engineered costs derived from the set of movement restrictions for the vehicle;

generating, using a machine learning model, a delta cost volume using the initial cost volume and environment data of the environment, wherein the machine learning model is trained based upon observed driving behavior of vehicles;

scoring a trajectory of the potential trajectories based on the initial cost volume and the delta cost volume;

controlling the vehicle based upon the trajectory; and in response to computed measurements from the delta cost volume resulting in a finalized cost volume to satisfy a threshold measurement, adjusting the initial cost volume with the finalized cost volume associated with the potential trajectories, wherein the finalized cost volume comprises combining parts of the initial cost volume and the delta cost volume.

14. The system of claim 13, wherein the one or more processors are further operable when executing the instructions to perform operations comprising:

scoring remaining potential trajectories in the potential trajectories based on the initial cost volume and the delta cost volume;

ranking the remaining potential trajectories based on their respective scores; and selecting a top-ranked potential trajectory from the potential trajectories as the trajectory.

15. The system of claim 13, wherein the one or more processors are further operable when executing the instructions to perform operations comprising:

generating the environment data by rasterizing one or more top-down images of the vehicle and agents around the vehicle in the environment.

16. The system of claim 13, wherein the environment data comprises information comprising one or more of:

distances between the vehicle and agents;

lane boundaries associated with the environment;

velocities of the vehicle and the agents;

driving directions of the vehicle and the agents;

yield relationships between the vehicle and the agents; or locations of the vehicle and the agents.

17. A computer-readable non-transitory storage media embodying software that is operable when executed to cause operations comprising:

determining an initial cost volume associated with potential trajectories of a vehicle in an environment based on a set of movement restrictions of the vehicle, wherein the initial cost volume is based upon hand-engineered costs derived from the set of movement restrictions for the vehicle;

generating, using a machine learning model, a delta cost volume using the initial cost volume and environment data of the environment, wherein the machine learning model is trained based upon observed driving behavior of vehicles;

scoring a trajectory of the potential trajectories based on the initial cost volume and the delta cost volume;

controlling the vehicle based upon the trajectory; and in response to computed measurements from the delta cost volume resulting in a finalized cost volume to satisfy a threshold measurement, adjusting the initial cost volume with the finalized cost volume associated with the potential trajectories, wherein the finalized cost volume comprises combining parts of the initial cost volume and the delta cost volume.

18. The computer-readable non-transitory storage media of claim 17, wherein the software is further operable when executed to cause operations comprising:

scoring remaining potential trajectories in the potential trajectories based on the initial cost volume and the delta cost volume;

ranking the remaining potential trajectories based on their respective scores; and selecting a top-ranked potential trajectory from the potential trajectories as the trajectory.

19. The computer-readable non-transitory storage media of claim 17, wherein the software is further operable when executed to cause operations comprising:

generating the environment data by rasterizing one or more top-down images of the vehicle and agents around the vehicle in the environment.

20. The computer-readable non-transitory storage media of claim 17, wherein the environment data comprises information comprising one or more of:
  distances between the vehicle and agents;
  lane boundaries associated with the environment;
  velocities of the vehicle and the agents;
  driving directions of the vehicle and the agents;
  yield relationships between the vehicle and the agents; or
  locations of the vehicle and the agents.

* * * * *

UNITED STATES PATENT AND TRADEMARK OFFICE
CERTIFICATE OF CORRECTION

PATENT NO. : 11,634,161 B2
APPLICATION NO. : 16/911079
DATED : April 25, 2023
INVENTOR(S) : Tsung-Han Lin et al.

It is certified that error appears in the above-identified patent and that said Letters Patent is hereby corrected as shown below:

In the Specification
In Column 4, Line 63, after "e.g.," please replace "$t_o$" with "$t_0$".
In Column 5, Line 4, after "volume at" please replace "to" with "$t_0$".
In Column 5, Line 30, after "at" please replace "t0" with "$t_0$".
In Column 5, Line 40, after "at" please replace "t1" with "$t_1$".
In Column 5, Line 52, after "at" please replace "t0" with "$t_0$".
In Column 7, Line 52, after "Time" please replace "to" with "$t_0$".
In Column 8, Line 15, after "Time" please replace "to" with "$t_0$".
In Column 8, Line 39, after "Time" please replace "to" with "$t_0$".
In Column 8, Line 59, after "Time" please replace "to" with "$t_0$".
In Column 9, Line 16, after "Time" please replace "to" with "$t_0$".
In Column 9, Line 53, after "Time" please replace "to" with "$t_0$".
In Column 10, Line 11, after "Time" please replace "to" with "$t_0$".
In Column 10, Line 35, after "Time" please replace "$t_o$" with "$t_0$".
In Column 20, Line 47, after "time" please replace "to" with "$t_0$".
In Column 20, Line 49, after "the" please replace "$t_o$" with "$t_0$".
In Column 20, Line 60, after "times" please replace "$t_o$" with "$t_0$".
In Column 20, Line 61, after "times" please replace "$t_o$" with "$t_0$".

Signed and Sealed this
Thirtieth Day of May, 2023

Katherine Kelly Vidal
*Director of the United States Patent and Trademark Office*